(12) United States Patent
Abdallah

(10) Patent No.: US 11,003,459 B2
(45) Date of Patent: *May 11, 2021

(54) METHOD FOR IMPLEMENTING A LINE SPEED INTERCONNECT STRUCTURE

(71) Applicant: Intel Corporation, Santa Clara, CA (US)

(72) Inventor: Mohammad Abdallah, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 27 days.

This patent is subject to a terminal disclaimer.

(21) Appl. No.: 16/383,212

(22) Filed: Apr. 12, 2019

(65) Prior Publication Data

US 2019/0235877 A1 Aug. 1, 2019

Related U.S. Application Data

(63) Continuation-in-part of application No. 15/640,379, filed on Jun. 30, 2017, now Pat. No. 10,303,484,
(Continued)

(51) Int. Cl.
*G06F 9/38* (2018.01)
*H04L 12/28* (2006.01)
(Continued)

(52) U.S. Cl.
CPC .......... *G06F 9/3885* (2013.01); *G06F 9/3004* (2013.01); *G06F 9/3853* (2013.01);
(Continued)

(58) Field of Classification Search
CPC ... H04L 12/28; H04L 49/1523; G06F 9/3885; G06F 9/462; G06F 9/3853; G06F 9/3004;
(Continued)

(56) References Cited

U.S. PATENT DOCUMENTS 3,859,515 A 1/1975 Radcliffe, Jr.
4,644,533 A 2/1987 Braff et al.
(Continued)

FOREIGN PATENT DOCUMENTS

EP 0375249 A2 6/1990
EP 0935200 A1 8/1999
(Continued)

OTHER PUBLICATIONS

Abandonment from U.S. Appl. No. 14/213,909, mailed Jul. 14, 2017, 1 page.
(Continued)

*Primary Examiner* — Rasheed Gidado
(74) *Attorney, Agent, or Firm* — NDWE, LLP

(57) ABSTRACT

A method and apparatus including a cache controller coupled to a cache memory, wherein the cache controller receives a plurality of cache access requests, performs a pre-sorting of the plurality of cache access requests by a first stage of the cache controller to order the plurality of cache access requests, wherein the first stage functions by performing a presorting and pre-clustering process on the plurality of cache access requests in parallel to map the plurality of cache access requests from a first position to a second position corresponding to ports or banks of a cache memory, performs the combining and splitting of the plurality of cache access request by a second stage of the cache controller, and applies the plurality of cache access requests to the cache memory at line speed.

18 Claims, 25 Drawing Sheets

Related U.S. Application Data which is a continuation of application No. 14/213,909, filed on Mar. 14, 2014, now Pat. No. 9,740,499.

(60) Provisional application No. 61/852,389, filed on Mar. 15, 2013.

(51) Int. Cl.

| | |
|---|---|
| *G06F 12/00* | (2006.01) |
| *G06F 9/46* | (2006.01) |
| *G06F 15/173* | (2006.01) |
| *G06F 9/30* | (2018.01) |
| *G06F 13/00* | (2006.01) |
| *H04L 12/933* | (2013.01) |
| *G06F 12/0886* | (2016.01) |
| *G06F 12/0853* | (2016.01) |

(52) U.S. Cl.
CPC ............. *G06F 9/462* (2013.01); *G06F 12/00* (2013.01); *G06F 12/0853* (2013.01); *G06F 12/0886* (2013.01); *G06F 13/00* (2013.01); *G06F 15/17318* (2013.01); *H04L 12/28* (2013.01); *H04L 49/1523* (2013.01); *G06F 2212/1041* (2013.01); *G06F 2212/1056* (2013.01)

(58) Field of Classification Search
CPC .. G06F 12/00; G06F 12/0886; G06F 12/0853; G06F 15/17318
See application file for complete search history.

(56) References Cited

U.S. PATENT DOCUMENTS

| | | | |
|---|---|---|---|
| 4,777,587 | A | 10/1988 | Case et al. |
| 5,179,689 | A | 1/1993 | Leach et al. |
| 5,303,362 | A | 4/1994 | Butts, Jr. et al. |
| 5,561,775 | A | 10/1996 | Kurosawa et al. |
| 5,937,202 | A | 8/1999 | Crosetto |
| 6,088,793 | A | 7/2000 | Liu et al. |
| 6,338,108 | B1 | 1/2002 | Motomura |
| 6,782,405 | B1 | 8/2004 | Matula et al. |
| 6,791,995 | B1 | 9/2004 | Azenkot et al. |
| 6,980,543 | B1 | 12/2005 | Kastenholz et al. |
| 7,200,865 | B1 | 4/2007 | Roscoe et al. |
| 7,296,112 | B1 | 11/2007 | Yarlagadda et al. |
| 7,521,961 | B1 | 4/2009 | Anderson |
| 7,664,905 | B2 * | 2/2010 | Jarosh ................. G06F 13/1626 711/154 |
| 7,688,815 | B2 | 3/2010 | Bialkowski et al. |
| 7,782,873 | B2 | 8/2010 | Sharma et al. |
| 8,068,817 | B1 | 11/2011 | Viswanath et al. |
| 8,510,496 | B1 * | 8/2013 | Totolos, Jr. ........... G06F 3/0613 711/147 |
| 9,092,305 | B1 * | 7/2015 | Blott ..................... G06F 12/00 |
| 9,378,125 | B2 * | 6/2016 | Lee ..................... G06F 12/00 |
| 9,753,691 | B2 * | 9/2017 | Abdallah ............. G06F 9/3001 |
| 10,866,902 | B2 * | 12/2020 | Bhati .................. G06F 12/0811 |
| 2002/0174321 | A1 | 11/2002 | John et al. |
| 2003/0063348 | A1 | 4/2003 | Posey et al. |
| 2004/0190503 | A1 | 9/2004 | Bansal et al. |
| 2004/0202178 | A1 | 10/2004 | Okubo |
| 2004/0213291 | A1 | 10/2004 | Beshai et al. |
| 2004/0268096 | A1 | 12/2004 | Master et al. |
| 2005/0135322 | A1 | 6/2005 | Lim et al. |
| 2006/0013207 | A1 * | 1/2006 | McMillen ................ H04Q 3/68 370/388 |
| 2006/0140203 | A1 | 6/2006 | Jain et al. |
| 2006/0168400 | A1 | 7/2006 | Ronciak et al. |
| 2006/0171418 | A1 | 8/2006 | Casini et al. |
| 2006/0206603 | A1 * | 9/2006 | Rajan ..................... G06F 3/067 709/223 |
| 2006/0218315 | A1 * | 9/2006 | Okajima ............. G06F 13/1605 710/35 |
| 2008/0151863 | A1 | 6/2008 | Lawrence et al. |
| 2008/0205314 | A1 | 8/2008 | Pecen |
| 2010/0175064 | A1 * | 7/2010 | Brahmaroutu ...... G06F 9/45558 718/1 |
| 2011/0047354 | A1 | 2/2011 | Hobson et al. |
| 2011/0085464 | A1 | 4/2011 | Nordmark et al. |
| 2011/0149991 | A1 | 6/2011 | Jiang |
| 2011/0314444 | A1 | 12/2011 | Zhang et al. |
| 2013/0179645 | A1 * | 7/2013 | Matsuo ................. G06F 15/167 711/151 |
| 2014/0089587 | A1 * | 3/2014 | Hikichi ............... G06F 12/0855 711/122 |
| 2014/0185611 | A1 | 7/2014 | Lie et al. |

FOREIGN PATENT DOCUMENTS

| | | |
|---|---|---|
| EP | 2738683 A1 | 6/2014 |
| TW | I321016 B | 2/2010 |
| WO | 2013011653 A1 | 1/2013 |

OTHER PUBLICATIONS

Barreiros, et al., "QOS-Enabled Networks: Tools and Foundations," Jan. 1, 2016, pp. 125-126.
Batcher, K.E., "Sorting Networks and their Applications," Spring Joint Computer Conference, Apr. 1968, pp. 307-314.
Brandner, et al., "Static Routing in Symmetric Real-Time Network-on-Chips," Informatics and Mathematical Modeling Technical University of Denmark, Nov. 2012, pp. 61-70.
Communication pursuant to Article 94(3) EPC for Application No. EP14768040.9, dated Sep. 26, 2017, 7 pages.
Decision to Grant a Patent from foreign counterpart Korean Patent Application No. KR1020157028995, dated Apr. 25, 2017, 2 pages.
Extended European Search Report for Application No. 14768040.9, dated Oct. 7, 2016, 14 pages.
Final Office Action from U.S. Appl. No. 14/214,049, dated Aug. 2, 2016, 9 pages.
First Office Action and Search Report from foreign counterpart China Patent Application No. 201480024465.9, dated Jun. 2, 2017, 16 pages.
Hendry, et al., "Time-Division-Multiplexed Arbitration in Silicon Nanophotonic Networks-On-Chip for High-Performance Chip Multiprocessors," Journal of Parallel and Distributed Computing, vol. 71 (5), Sep. 2010, pp. 641-650.
Hussain, S.A., "Active and Programmable Networks for Adaptive Architectures and Services," Dec. 15, 2006, pp. 199-226.
International Preliminary Report on Patentability for Application No. PCT/US2014/026427, dated Sep. 24, 2015, 6 pages.
International Search Report and Written Opinion for Application No. PCT/US2014/026427, dated Jul. 8, 2014, 7 pages.
Non-Final Office Action from U.S. Appl. No. 15/640,379, dated Aug. 9, 2018, 24 pages.
Non-Final Office Action from U.S. Appl. No. 14/213,909, dated Aug. 12, 2016, 12 pages.
Non-Final Office Action from U.S. Appl. No. 14/213,909, dated Feb. 11, 2016, pages.
Non-Final Office Action from U.S. Appl. No. 14/214,049, dated Dec. 29, 2016, 9 pages.
Non-Final Office Action from U.S. Appl. No. 14/214,049, dated Mar. 2, 2016, 10 pages.
Non-Final Office Action from U.S. Appl. No. 15/659,393, dated Sep. 5, 2018, 29 pages.
Notice of Allowance from U.S. Appl. No. 15/640,379, dated Feb. 6, 2019, 12 pages.
Notice of Allowance from U.S. Appl. No. 15/659,393, dated Feb. 13, 2019, 7 pages.
Notice of Allowance from U.S. Appl. No. 14/213,909, dated Jan. 18, 2017, 7 pages.
Notice of Allowance from U.S. Appl. No. 14/213,909, dated Mar. 29, 2017, 5 pages.
Notice of Allowance from U.S. Appl. No. 14/214,049, dated Apr. 27, 2017, 13 pages.

(56) References Cited

OTHER PUBLICATIONS

Notice on Grant of Patent for from foreign counterpart China Patent Application No. 201480024465.9, dated Dec. 13, 2017, 4 pages.
Notification of Reason for Refusal from foreign counterpart Korean Patent Application No. 1020157028995, dated Oct. 11, 2016, 9 pages.
Office Action from foreign counterpart Taiwan Patent Application No. 103109879, dated Dec. 20, 2016, 15 pages.
Summons to attend oral proceedings pursuant to Rule 115(1) EPC for Application No. EP14768040.9, mailed Apr. 4, 2018, 9 pages.
Notification of Reason for Refusal, Korean Patent Application No. 10-2017-7020848, dated May 21, 2019, pp. 1-5.
Notice of Final Rejection, Korean Patent Application No. 10-2017-7020848, dated Jul. 30, 2019, pp. 1-2.
Brief Communication, European Patent Application No. 14768040.9, dated Nov. 26, 2018, pp. 1-10.
Minutes, European Patent Application No. 14768040.9, mailed Dec. 19, 2018, pp. 1-5.
Decision to Refuse, European Patent Application No. 14768040.9, dated Jan. 17, 2019, pp. 1-12.
Office Action, IN App No. 5550/CHENP/2015, dated Feb. 7, 2020, 7 pages.

\* cited by examiner

NETWORKING IMPLEMENTATION

| E3-E10 | ORIGINAL POSITION | FB | NP | SERIAL MODE FB | NEW POSITION | PACKET NUMBER |
|---|---|---|---|---|---|---|
| E3 | 0 | 0 | 1 | S[d1] | 0 | 0 | 0 |
| E4 | 1 | 0 | 0 | S[d1] | 0 | 1 | 0 |
| E5 | 2 | 1 | 1 | L[d1] | 1 | 2 | 1 |
| E6 | 3 | 0 | 1 | S[d1] | 0 | 4 | 2 |
| E7 | 4 | 3 | 0 | VL[d1] | 4 | 6* | 3 |
| E8 | 5 | 1 | 0 | L[d1] | 1 | 10 | 5 |
| E9 | 6 | 0 | 0 | S[d1] | 0 | 12 | 6 |
| E10 | 7 | 0 | 1 | S[d2] | 1 | 14 | 7 |

Columns: G3-G10 (FB), I3-I10 (NP), M3-M10 (Serial Mode FB)

---

Evaluating new position for element E5    401

M5=G5+OR(MOD(G5,2),I5)*(MOD(E5+MOD(SUM(M$2:M4),2),2))
M5=1+OR(MOD(1,2),1)*(MOD(2+MOD(SUM(0+0+0),2),2))=1
New Position=E5+(SUM(M$3:M5)-G5
New Position=2+(SUM(0+0+0+1)-1=2

---

Evaluating new position for element E6    402

M6=G6+OR(MOD(G6,2),I6)*(MOD(E6+MOD(SUM(M$2:M5),2),2))
M6=0+OR(MOD(0,2),1)*(MOD(3+MOD(SUM(0+0+0+1),2),2))=0
New Position=E6+(SUM(M$3:M6)-G6
New Position=3+(SUM(0+0+0+1)-0=4

FIG. 4

Parallel line speed grouping & splitting

| H-Index | D | E | F | G | I | J | K | M | N | | | |
|---|---|---|---|---|---|---|---|---|---|---|---|---|
| V-Index | Inst begin | initial pos | (FBorNP)' FB | NP | FBorNP | Mod pos | Serial mod FB/NP | Parallel mod FB/NP | New Inst pos | para Inst pos+1 | B# |
| 3 | 1 | 0 | 1 | 0 | 0 | 0 | 0 | 0 | 0 | 0 | 1 | 0 |
| 4 | 1 | 1 | 1 | 0 | 0 | 0 | 1 | 0 | 0 | 1 | 2 | 0 |
| 5 | 1 | 2 | 1 | 0 | 0 | 0 | 0 | 0 | 0 | 2 | 3 | 1 |
| 6 | 1 | 3 | 0 | 1 | 1 | 1 | 1 | 1 | 1 | 4 | 5 | 2 |
| 7 | 1 | 4 | 0 | 1 | 1 | 1 | 0 | 2 | 2 | 6 | 7 | 3 |
| 8 | 1 | 5 | 1 | 0 | 0 | 0 | 1 | 0 | 0 | 8 | 9 | 4 |
| 9 | 1 | 6 | 0 | 3 | 0 | 1 | 0 | 4 | 4 | 10 | 11 | 5 |
| 10 | 1 | 7 | 0 | 0 | 1 | 1 | 1 | 0 | 0 | 14 | 15 | 7 |

FIG. 14

| Serial Mode FB/NP (recursive) | Inst position |
|---|---|
| G3+OR(MOD(MOD(G3,2),I3)*(MOD(E3+MOD(SUM(M$2:M2),2),2)) | E3+SUM(M$3:M3)-G3 |
| G4+OR(MOD(MOD(G4,2),I4)*(MOD(E4+MOD(SUM(M$2:M3),2),2)) | E4+SUM(M$3:M4)-G4 |
| G5+OR(MOD(MOD(G5,2),I5)*(MOD(E5+MOD(SUM(M$2:M4),2),2)) | E5+SUM(M$3:M5)-G5 |
| G6+OR(MOD(MOD(G6,2),I6)*(MOD(E6+MOD(SUM(M$2:M5),2),2)) | E6+SUM(M$3:M6)-G6 |
| G7+OR(MOD(MOD(G7,2),I7)*(MOD(E7+MOD(SUM(M$2:M6),2),2)) | |
| G8+OR(MOD(MOD(G8,2),I8)*(MOD(E8+MOD(SUM(M$2:M7),2),2)) | |
| G9+OR(MOD(MOD(G9,2),I9)*(MOD(E9+MOD(SUM(M$2:M8),2),2)) | |
| G10+OR(MOD(MOD(G10,2),I10)*(MOD(E10+MOD(SUM(M$2:M9),2),2)) | |

FIG. 14 (CONT.)

| H-Index | V-Index | Inst begin | initial pos (FBorNP)' | FB | NP | FBorNP | Mod pos | Serial mod FB/NP | Parallel mod FB/NP | New Inst pos | para Inst pos+1 | B# |
|---|---|---|---|---|---|---|---|---|---|---|---|---|
| 3 | 1 | 0 | 1 | 0 | 0 | 0 | 0 | 0 | 0 | 0 | 1 | 0 |
| 4 | 1 | 1 | 1 | 0 | 0 | 0 | 1 | 0 | 0 | 1 | 2 | 0 |
| 5 | 1 | 2 | 1 | 0 | 0 | 0 | 0 | 0 | 0 | 2 | 3 | 1 |
| 6 | 1 | 3 | 0 | 1 | 1 | 1 | 1 | 1 | 1 | 4 | 5 | 2 |
| 7 | 1 | 4 | 0 | 1 | 1 | 1 | 0 | 2 | 2 | 6 | 7 | 3 |
| 8 | 1 | 5 | 1 | 0 | 0 | 0 | 1 | 0 | 0 | 8 | 9 | 4 |
| 9 | 1 | 6 | 0 | 3 | 0 | 1 | 0 | 4 | 4 | 10 | 11 | 5 |
| 10 | 1 | 7 | 0 | 0 | 1 | 1 | 1 | 0 | 0 | 14 | 15 | 7 |

FIG. 14 (CONT.)

Parallel Mod FB/NP

G3+J3*MOD(K3,2)

G4+J4*MOD(K4+G3+(J3*K3),2)

G5+J5*MOD(K5+G4+(J4*K4)+(F4*G3)+(F4*J3*K3),2)

G6+J6*MOD(K6+G5+(J5*K5)+(F5*G4)+(F5*J4*K4)+(F5*F4*G3)+(F5*F4*J3*K3),2)

G7+J7*MOD(K7+G6+(J6*K6)+(F6*G5)+(F6*J5*K5)+(F6*F5*G4)+(F6*F5*J4*K4)+(F6*F5*F4*G3)+(F6*F5*F4*J3*K3),2)

G8+J8*MOD(K8+G7+(J7*K7)+(F7*G6)+(F7*J6*K6)+(F7*F6*G5)+(F7*F6*J5*K5)+(F7*F6*F5*G4)+(F7*F6*F5*J4*K4)+(F7*F6*F5*F4*G3)
+(F7*F6*F4*J3*K3),2)

Inst position

E3+SUM(M$3:M3)-G3

E4+SUM(M$3:M4)-G4

E5+SUM(M$3:M5)-G5

E6+SUM(M$3:M6)-G6

FIG. 14 (CONT.)

Modulo 2 addition and multiplication.

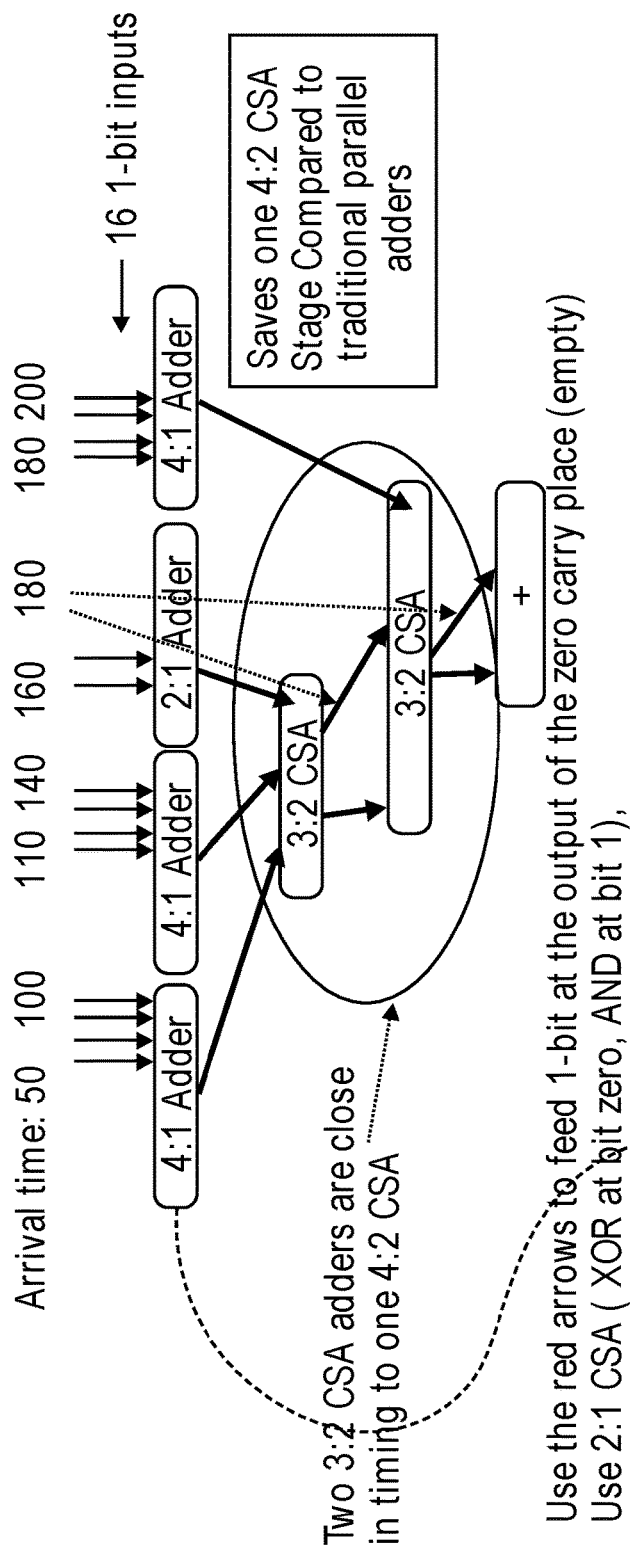
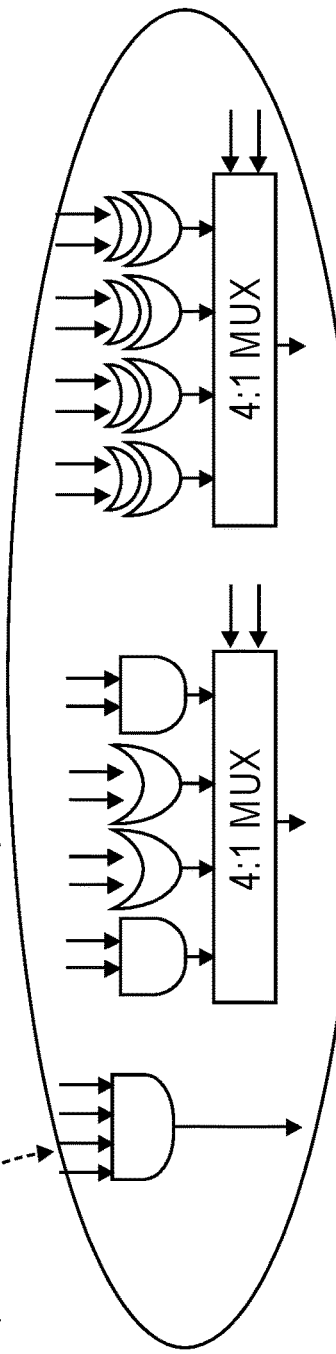
FIG. 21

METHOD FOR IMPLEMENTING A LINE SPEED INTERCONNECT STRUCTURE

CROSS-REFERENCE TO RELATED APPLICATIONS

This application is a continuation of U.S. application Ser. No. 15/640,379 filed Jun. 30, 2017 (now U.S. Pat. No. 10,303,484 issued May 28, 2019), which is a continuation of U.S. application Ser. No. 14/213,909 filed Mar. 14, 2014 (now U.S. Pat. No. 9,740,499 issued Aug. 22, 2017), which claims the benefit of U.S. Provisional Application No. 61/852,389 filed Mar. 15, 2013, which are hereby incorporated by reference.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using sate of the art compiler or user parallelization techniques for non-explicitly/easily parallelized/threaded software codes.

SUMMARY OF THE INVENTION

In one embodiment, the present invention is implemented as a method for line speed interconnect processing. The method includes receiving initial inputs from an input communications path, performing a pre-sorting of the initial inputs by using a first stage interconnect parallel processor to create intermediate inputs, and performing the final combining and splitting of the intermediate inputs by using a second stage interconnect parallel processor to create resulting outputs. The method further includes transmitting the resulting outputs out of the second stage at line speed.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 14 shows a graphical depiction of a spreadsheet illustrating the modulo two evaluation equations in accordance with one embodiment of the present invention.

FIG. 21 shows an embodiment of a stage optimized high-speed parallel adder in accordance with one embodiment of the present invention.

DETAILED DESCRIPTION OF THE INVENTION

Figure 1:
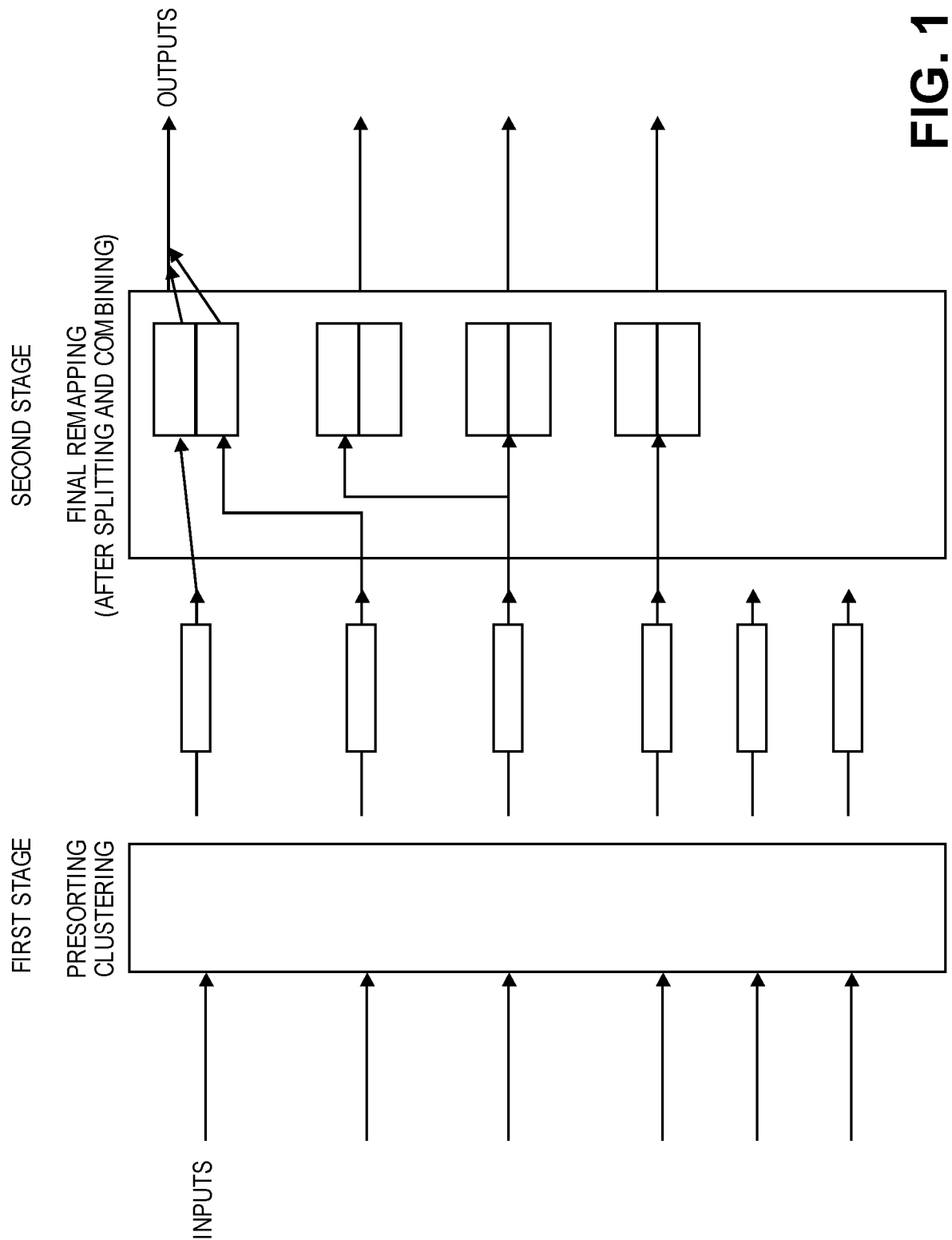
FIG. 1 shows an overview diagram of a line speed interconnect structure in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement a line speed interconnect structure for use in applications that require extremely low latency. There are many networking impact such applications that cannot tolerate latency. To forward incoming packets to different destinations a very high-speed circuit is required. The following figures illustrate several embodiments of such a high-speed circuit and illustrate uses of such a structure in a networking environment switching packets, in a processing environment managing accesses to different cache lines and accesses to different open DRAM pages, and any processing environment merging and/or splitting macro instructions into corresponding merged and/or split microinstructions.

In many implementations, elements come as a paralleled requests or packets and they undergo one or two generic actions. For example, two or more of them can be combined, merged or grouped to form a unified/uniform request or packet. The other action can be splitting or fragmenting the request or packet into two or more requests or packets. Another example is variable length networking packets. The same concepts can be applied to fixed size packets where multiple fixed sizes are supported.

The following figures illustrate different embodiments of such a line speed interconnect structure. It should be noted that the term "destination" does not necessarily mean the final destination.

FIG. 1 shows an overview diagram of a line speed interconnect structure in accordance with one embodiment of the present invention. The FIG. 1 overview diagram shows how the line speed interconnect comprises two stages.

In the FIG. 1 embodiment, the first stage receives the initial inputs and performs pre-sorting/clustering on the initial inputs. The outputs of the first stage are passed on to the second stage which performs a final remapping. Outputs from the second stage are then passed on at line speed. The pre-sorting stage functions by identifying potential candidates among the initial inputs to be checked for pairing, using for example, first match of a destination ID, or the like. The second stage then performs the position shuffling, pairing or splitting. Line speed is achieved by being able to combine and split inputs and create resulting outputs in a parallel manner.

The structure of FIG. 1 can be applied in a number of different implementations, which will be described in subsequent figures. Implementations include a networking architecture, a cache accessing architecture, a DRAM accessing architecture, and arbitration architecture, and a computer instruction combining/splitting architecture. Throughout these implementations the overall structure diagrammed here in FIG. 1 provides line speed combining/splitting of inputs into resulting outputs.

Figure 2:
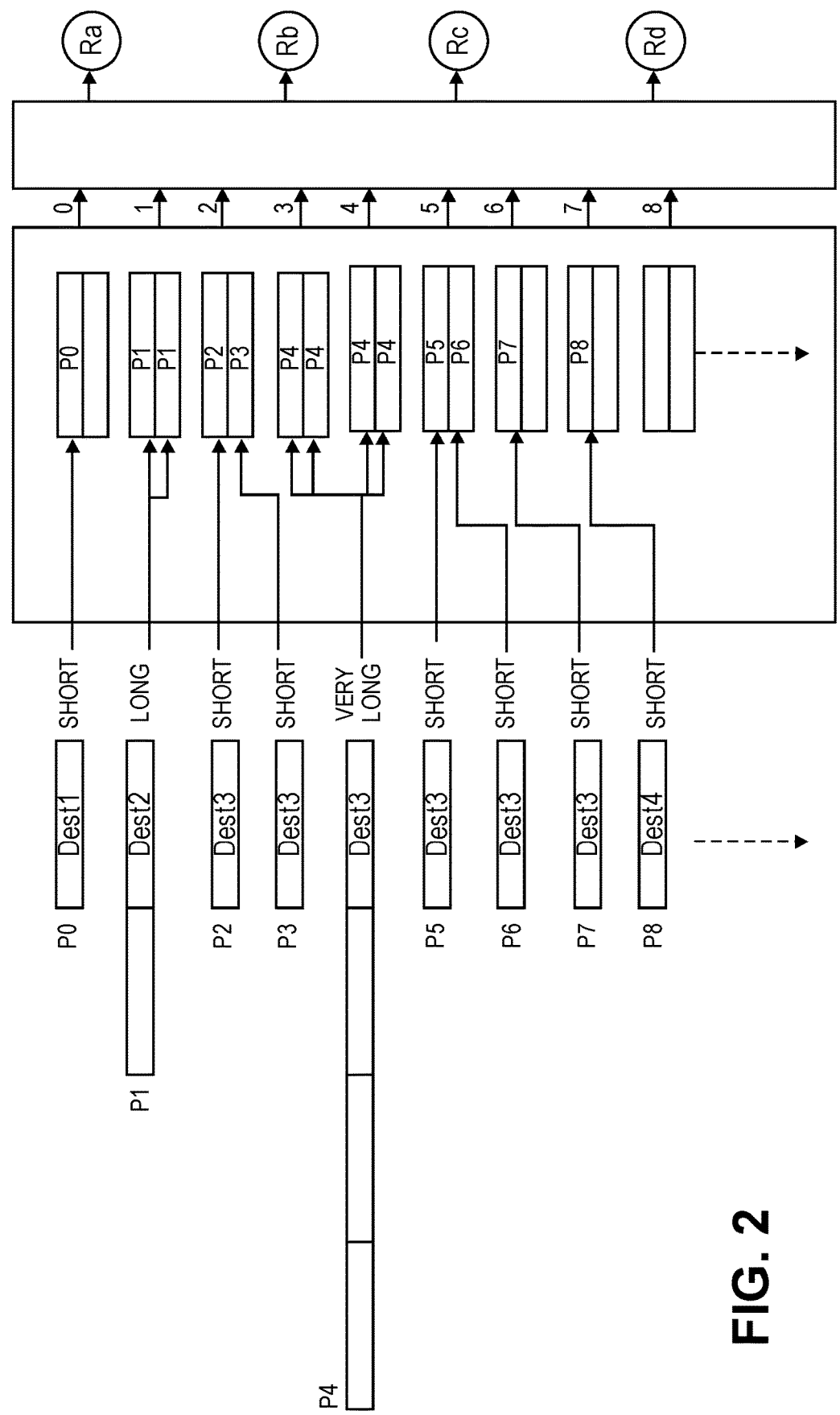
FIG. 2 shows an overview of a networking implementation of the line speed interconnect structure in accordance with one embodiment of the present invention.

FIG. 2 shows an overview of a networking implementation of the line speed interconnect structure in accordance with one embodiment of the present invention.

As described above, there are many applications where a set of input requests, accesses, data, instructions or packets undergo a remapping/multiplexing or shuffling of those inputs to different outputs; a very common reason for that is if two or more of those inputs merge, combine or get grouped together, another reason is when those inputs get split, divided, fragmented or broadcasted, these two reasons can cause a complete remapping of the inputs to the outputs of any interface, interconnect, shuffling, instruction decoding, routing or any multiplexing of data or requests or accesses. It is important also in many of these applications and implementations that line speed/pipeline speed is maintained with such remapping functionalities.

FIG. 2 shows a networking implementation that takes advantage of the low latency qualities of the line speed interconnect structure, wherein networking packets undergo a remapping/combining/shuffling/splitting process to take incoming packets (shown as packets P0 through P8 on the left-hand side of FIG. 2) and process them into outgoing packets (e.g., shown as the arrows 0-8 going into the central router). The central router then sends the packets onto their destinations, shown as Ra through Rd.

Thus, FIG. 2 shows a process where the destinations and the sizes of the incoming packets determine how they are split/combined/shuffled/reordered. In one embodiment, the goal is to pair two short packets that are going to the same next destination (across the same transient path). The ideal condition for pairing would be instances where both packets are short packets and they are headed to the same destination. Additionally, in one embodiment, the goal is to take different size incoming packets and perform the splitting/combining/shuffling/reordering process to create uniform sized outgoing packets that are sent to the central router. Each outgoing packet is shown as having an upper half and a lower half (e.g., even or odd) to show how multiple short packets can be combined.

As shown in FIG. 2, P0 is going to destination one and is a short packet, it is placed in the outgoing packet zero. The next packet, P1, is a medium sized packet and is going to a different destination than P0. P1 is ordered into the upper and lower halves of outgoing packet one. P2 and P3 are both short packets that are both going to the same destination, in this case destination 3. Accordingly, P2 and P3 are combined into outgoing packet two. P4 is a large packet, and the shows an example where the large packet is split into two or more outgoing packets, shown here as P4 being split to occupy outgoing packets three and four. P5 and P6 are both short packets are going to the same destination and are thus combined into outgoing packet five. P7 and P8 are both short packets that are going to different destinations and thus cannot be combined. So they are each assigned to their own respective outgoing packet six and seven. And so this process continues for all the incoming packets that are received. As diagrammed in FIG. 2, this process is implemented in parallel and with very little latency (e.g., line speed).

Figure 3:
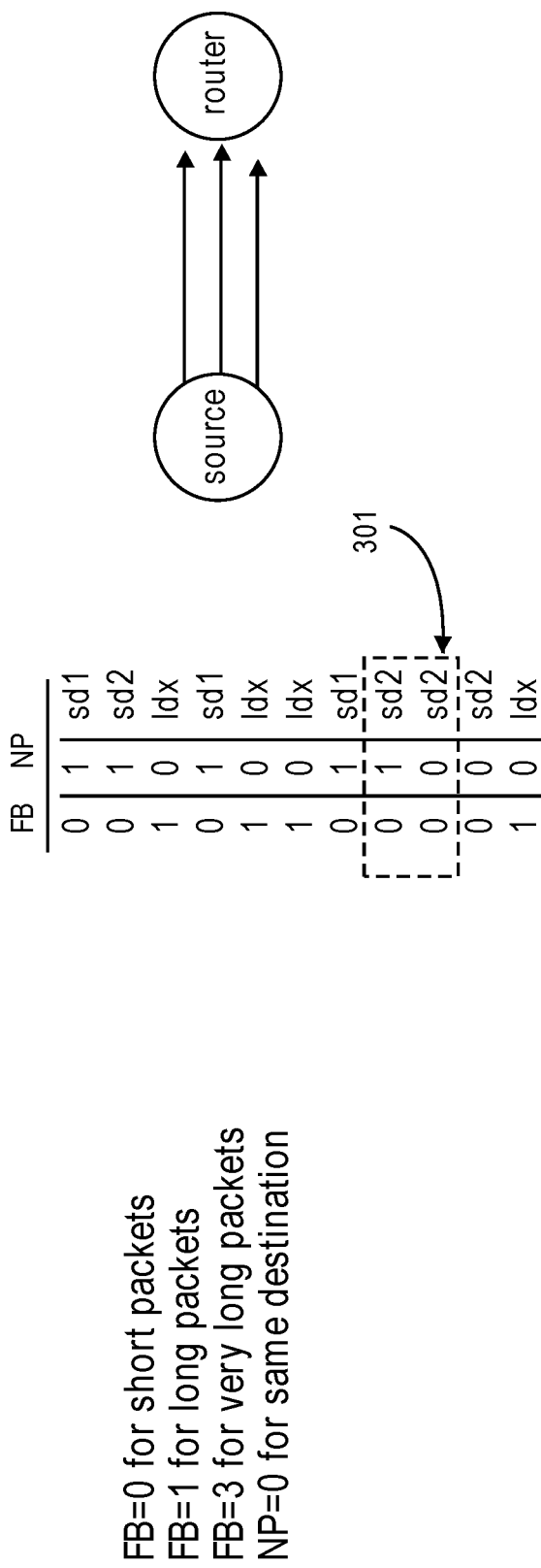
FIG. 3 shows certain terminology used by processes of the line speed interconnect structure in accordance with one embodiment of the present invention.

FIG. 3 shows certain terminology used by processes of the line speed interconnect structure in accordance with one embodiment of the present invention. In this embodiment, the term FB=0 indicates short packets, the term FB=1 indicates long packets, and the term FB=3 indicates very long packets. The term NP=0 indicates packets having the same destination. As described above, in one embodiment, the goal is to pair two short packets that are going to the same next destination (across the same transient path). The ideal condition for pairing would be instances where both packets are short packets and they are headed to the same destination. Thus the table shown in FIG. 3 shows how the FB value and the NP value can be used to quickly evaluate whether incoming packets can be paired, split, or sent by themselves into the outgoing packets. In this manner, FB can be thought of as describing whether or not a bucket/block/packet is full or not and NP can describe whether they are headed to the same destination (e.g., as shown by the pair in the dotted box 301). The "sdx" term shown in FIG. 4 refers to a short packet going to destination "x" and the term "ldx" refers to a long packet going to destination "x".

Figure 4:
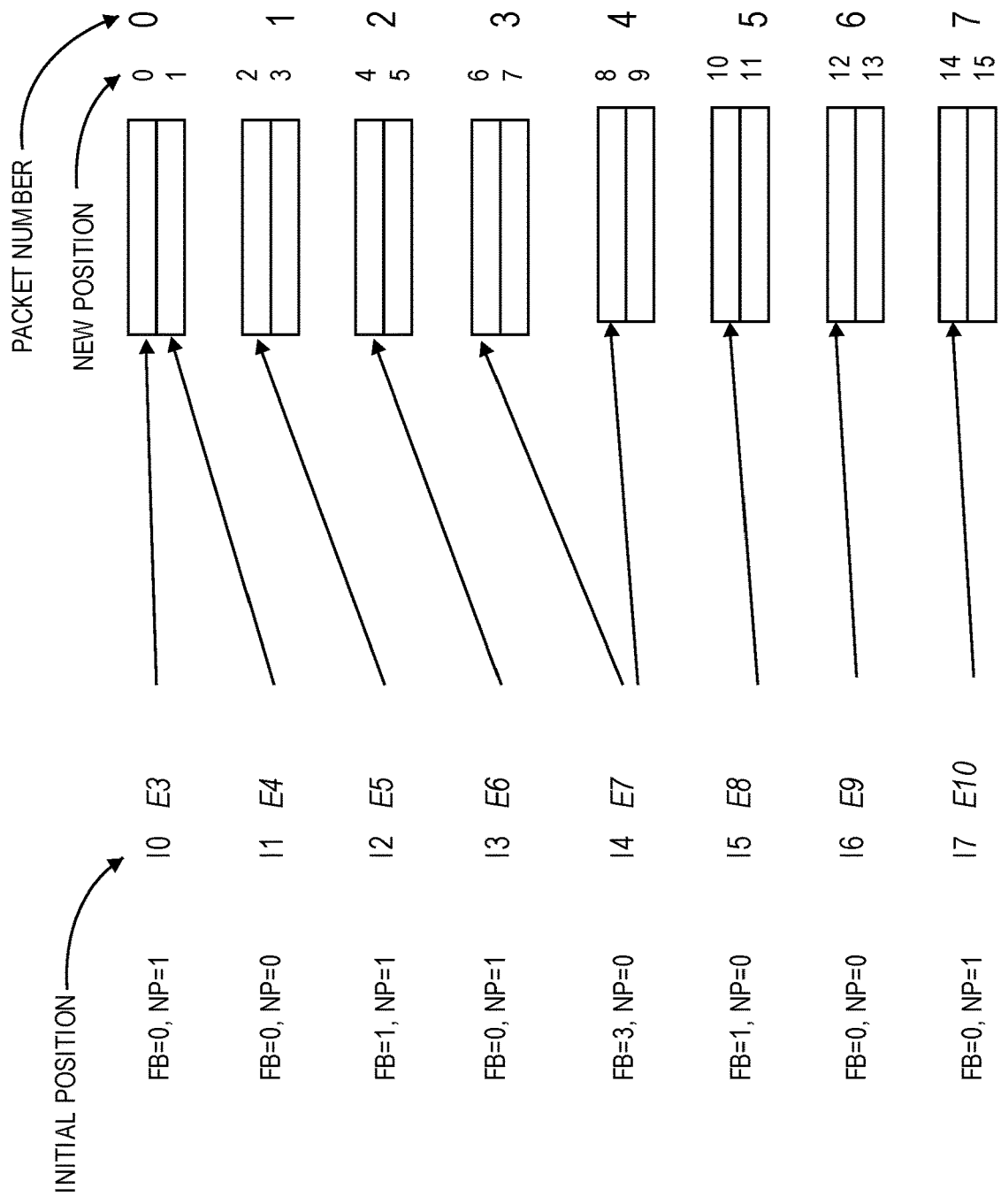
FIG. 4 shows a second diagram illustrating how the FB value and the NP value is used in accordance with one embodiment of the present invention.

FIG. 4 shows a second diagram illustrating how the FB value and the NP value is used in accordance with one embodiment of the present invention. FIG. 4 shows the manner in which an evaluating equation is used to process all the incoming packets and determine the splitting/combining/reordering of the incoming packets into outgoing packets. Additionally, this evaluating is performed in parallel.

As described above, the goal is to pair two short packets that are going to the same next destination (e.g., across the same transient path). The condition for both packets should be FB=0 (e.g., both are short packets) and the later packet should have an NP=0 (e.g., later packet has the same destination as the earlier packet and can thus be paired). The evaluating equation can be written as M5=G5+OR(MOD(G5,2),I5)*(MOD(E5+MOD(SUM(M$2:M4),2),2)), where MOD refers to modulo two arithmetic. This is shown in box 401, which shows an example for evaluating the new position for element E5. Box 402 shows another example for evaluating the new position for element E6. The asterisk above 6 indicates that 6 is the position of the first part of the split. The position of the second part of the split is generated locally by adding 2 to the position of the first part of the split.

The OR in the above equation is trying to find out whether NP or FB is set. If either is set, the evaluation process is going to create a bubble, and the bubble will be in the upper half or the lower half (e.g., even or odd) position. The equation sums the current position plus all accumulations of the bubbles before the current position. The operation of the equation is shown in the table depicted in FIG. 4 and is also shown by the lower half of FIG. 4, where the incoming packets 10-17 are depicted as to how they are processed into the outgoing packets 0-7.

Figure 5:
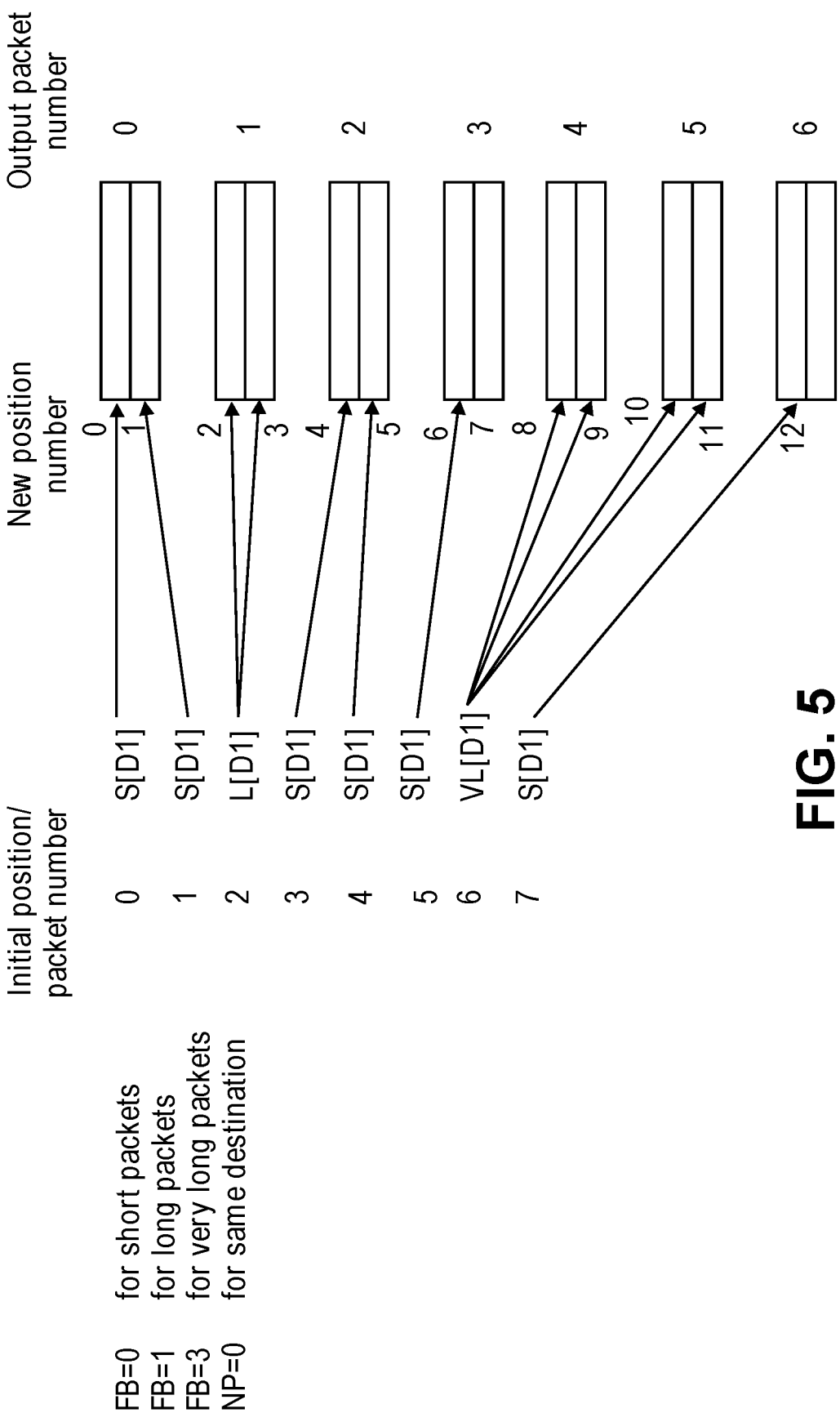
FIG. 5 shows another diagram illustrating the relationship between the initial position/packet number, the new position number in the new packet, and the resulting output packet number in accordance with one embodiment of the present invention.

FIG. 5 shows another diagram illustrating the relationship between the initial position/packet number, the new position number in the new packet, and the resulting output packet number in accordance with one embodiment of the present invention. The incoming packet can be short as signified by "S", long as signified by "L", or very long as signified by "VL". In this example, the destinations are all the same as signified by the term "D1". Thus FIG. 5 is an illustration of how initial packet positions are changed into new packet positions of the resulting outgoing packets. Some packets are combined (e.g., packet 0 and packet 1), and some packets are split (e.g., packet 2 and packet 6). In particular, FIG. 5 shows how a very large packet (e.g., packet 6) is split to occupy to output packets. This processing of the initial packets is performed in parallel in accordance with the modulo two evaluating equation described above.

Figure 6:
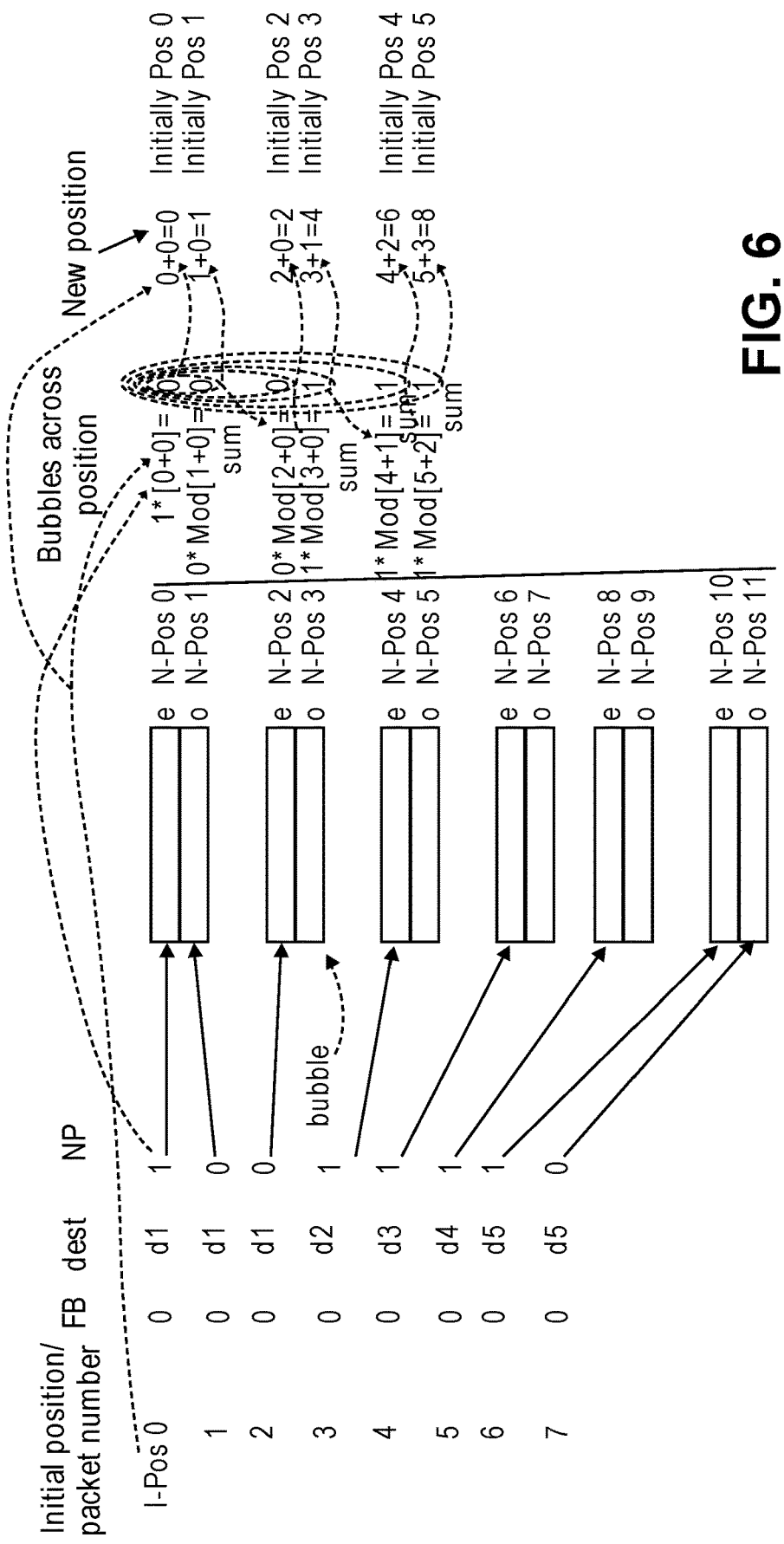
FIG. 6 shows a more detailed diagram of the operation of the modulo two evaluating equation described above in accordance with one embodiment of the present invention.

FIG. 6 shows a more detailed diagram of the operation of the modulo two evaluating equation described above in accordance with one embodiment of the present invention.

As described above, in many implementations, elements come as a paralleled requests or packets and they undergo one or two generic actions. Two or more of them can be combined, merged or grouped to form a unified/uniform request or packet. The other action can be splitting or fragmenting the request or packet into two or more requests or packets. First example is variable length networking packets. The same concepts can be applied to fixed size packets where multiple fixed sizes are supported. And additionally, this evaluating the later packet should have an NP=0 (later packet has the same destination as the earlier packet and can thus be paired).

In many implementations, elements come as a paralleled requests or packets and they undergo one or two generic actions. Two or more of them can be combined, merged or grouped to form a unified/uniform request or packet. The other action can be splitting or fragmenting the request or packet into two or more requests or packets. First example is variable length networking packets. The same concepts can be applied to fixed size packets where multiple fixed sizes are supported.

The FIG. 6 embodiment describes the operation of a routing architecture implementation, where variable size initial packets are repositioned and placed into new outgoing uniform sized packets. In this implementation, the outgoing packets have even and odd positions. The variable sized initial packets are placed into the even and odd positions in accordance with a modulo two function, as described above. In this embodiment, "NP" indicator when set to zero for initial packets, indicates that these two packets can be combined or merged together as they are heading to the same intermediate/transient destination. When "NP" is set to 1 then they cannot be combined or merged together because they are heading to a different destinations. The grouping/combining can be facilitated for grouping more than two by adjusting the modulo function accordingly.

However, when the FB indicator is set to 1, a large packet needs to be fragmented into two smaller packets (the packet requires full block/bucket: a unified odd/even slots). Another reason FB is set to 1 is whenever an originally merged two packets that shared the same intermediate/transient destination needs to be split into two different packets with two different final destinations. FB could be set to 3 if the packet needs to be split into four pieces.

The FIG. 6 diagram on the left side shows the initial packet number/position, the values FB and NP, and the destination. On the right side of FIG. 6, the bubbles across positions, and the new positions are shown. The formula first calculates the cumulative displacement from initial position caused by bubbles. Then the new position is calculated by adding to the initial position the cumulative sum of the cumulative displacement. This cumulative some property is shown by the dotted line ovals, that show how each subsequent position is determined by the cumulative sum of all the prior positions. Additionally, the dotted arrows show how the initial position and the NP value factor into the evaluating equation.

Figure 7:
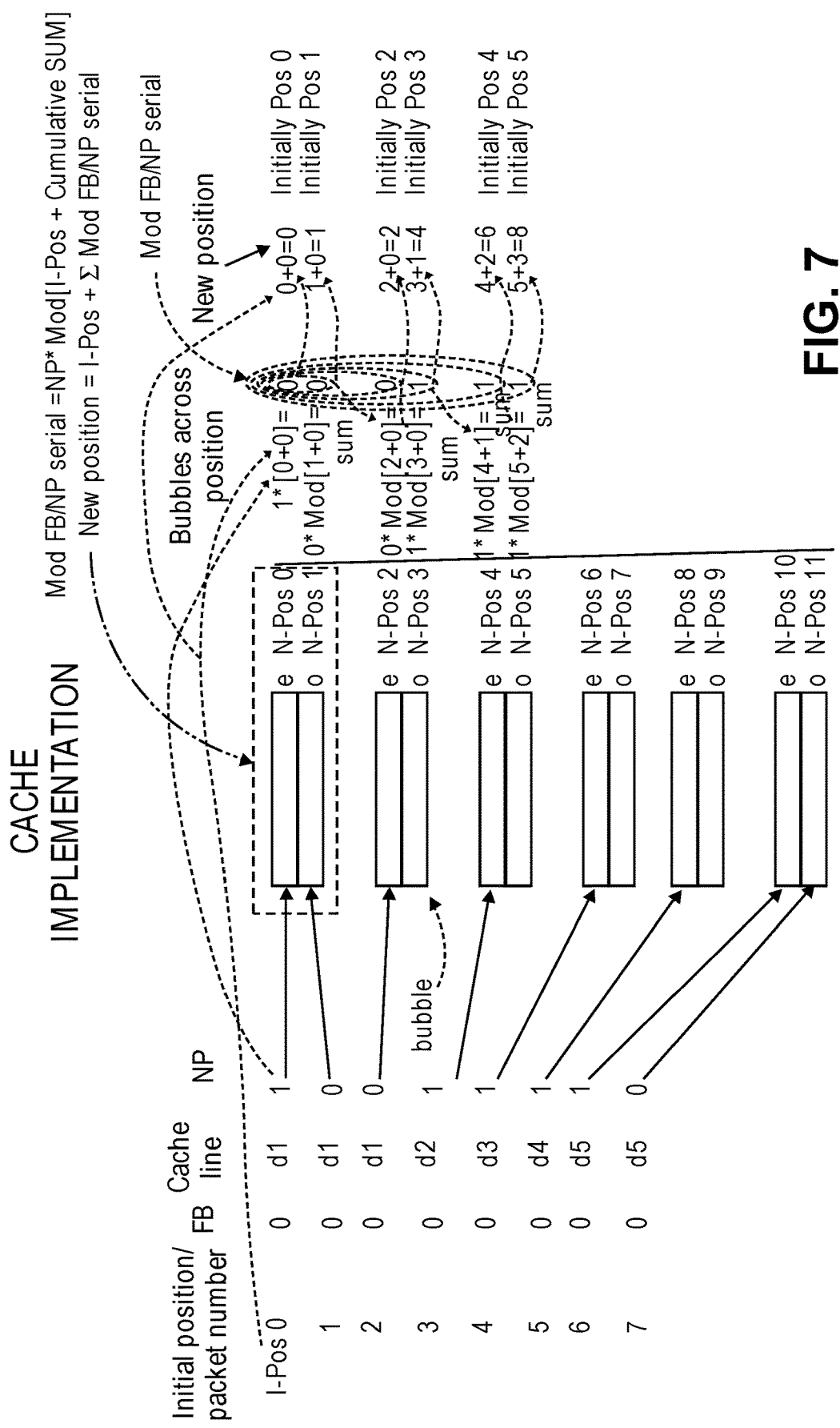
FIG. 7 describes the operation of a cache accessing implementation, where cache accesses are repositioned and placed into new outgoing cache accesses that are aligned with the sizes of the cache lines of the memory hierarchy in accordance with one embodiment of the present invention.

FIG. 7 describes the operation of a cache accessing implementation, where cache accesses are repositioned and placed into new outgoing cache accesses that are aligned with the sizes of the cache lines of the memory hierarchy in accordance with one embodiment of the present invention.

As described above, in many implementations, elements come as paralleled requests and they can undergo one or two processing actions. In one case, two or more of the requests can be combined, merged or grouped to form a unified/uniform request. The other case can be the splitting or fragmenting the request into two or more requests.

The FIG. 7 embodiment describes a memory/cache architecture where different memory requests access the same cache line in the presence of other memory requests that try to access other cache lines. In this case, merging two or more requests that access the same cache line is desired.

For example, requests can be reordered such that requests to the same cache line are merged so that only one request goes out for that cache line and that cache line comes back. No multiple requests and multiple returning of the same cache line. A nonaligned memory request (e.g., a request for data that spans across two different cache lines) is an example of splitting, where that request is split into two requests for the two different cache lines containing the nonaligned requested data.

In this embodiment, the two requests that are accessing the same cache line are combined into the same unified request (odd-even slots). The initial memory requests are placed into the even and odd positions in accordance with a modulo two evaluation function, as described above. In this embodiment, "NP" indicator when set to zero for initial requests, and indicates that these two requests can be combined or merged together as they are accessing the same cache line. When "NP" is set to 1 then they cannot be combined or merged together because they are accessing different cache lines. The grouping/combining can be facilitated for grouping more than two by adjusting the modulo function accordingly.

However, when the FB indicator is set to 1, an unaligned memory request needs to be split into two different cache line accesses. FB could be set to 3 if the access needs to be split into four cache line accesses, for example special memory requests that require accessing more than one cache line (e.g., string, buffer copy, I/O requests, and the like). As described above, the evaluation formula first calculates the cumulative displacement from initial position caused by bubbles. Then the new position is calculated by adding to the initial position the cumulative sum of the cumulative displacement.

It should be noted that in this memory/cache implementation (different from the networking case), when the two cache line requests are combined they become just a single request and they don't physically occupy the odd/even slot of a block/bucket. But the odd and even slot represent two different addresses within the cache line.

It should be noted that in this implementation, each odd even slots represents an access that can be carried independently to a different port or buss to the cache system/memory system.

Additionally, it should be noted that in this memory/cache implementation, the concept of a bubble is where there cannot be a utilization of both even and odd slots to access a given cache line.

In another embodiment, this same memory access concept described by FIG. 7 can be applied to DRAM controllers, where multiple requests can be combined together to access the same open DRAM page in the memory system. In such an embodiment, a DRAM pages are considered analogous to cache lines of the memory hierarchy. The analogy applies particularly to the manner in which the DRAM pages are open or closed. In this implementation, requests to DRAM are reordered such that requests to the same DRAM page are moved together so that they can access that the DRAM page while it's open. Requests to DRAM are much faster when that page is open versus accesses to a DRAM page which is closed. It takes an amount of latency to open a closed DRAM page. Thus, requests are reordered to the same bus/port/channel/DRAM memory bank to obtain the benefit of multiple accesses to the same DRAM bank/DRAM page.

Figure 8:
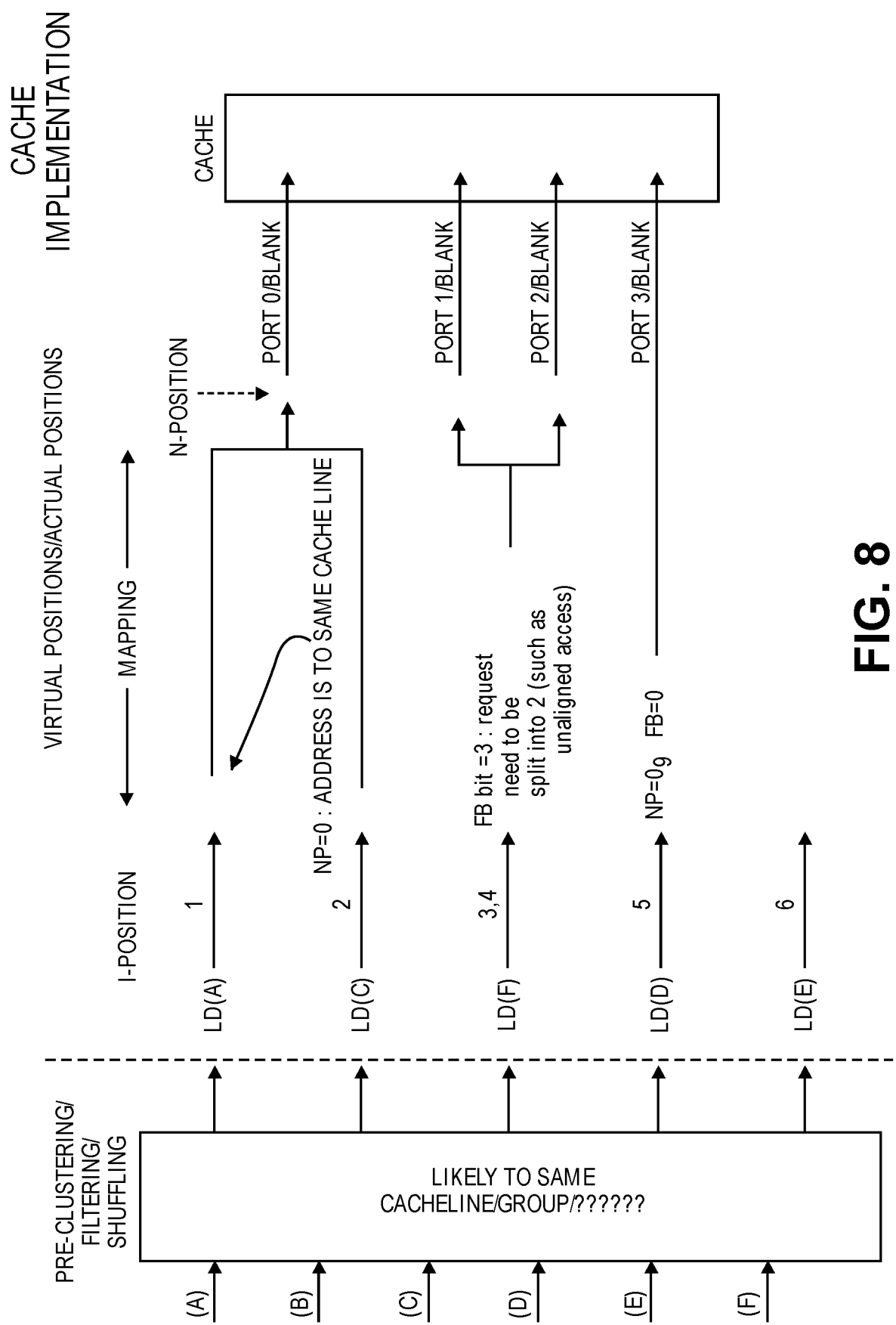
FIG. 8 shows a diagram illustrating the remapping process in accordance with ports of a cache in accordance with one embodiment of the present invention.

FIG. 8 shows a diagram illustrating the remapping process in accordance with ports of a cache in accordance with one embodiment of the present invention. The left-hand side of FIG. 8 shows a series of initial cache access requests, illustrated as "A" through "F". The evaluation process of the present invention performs a pre-clustering/filtering/shuffling process on the initial cache access requests. Mrs. diagrammed in FIG. 8 as the initial position, which then undergoes a mapping, to the new positions. These new positions correspond to ports or banks of the cache memory. FIG. 8 shows how the same structure described above can use NP values to determine whether accesses should be combined (e.g., LD(A) and LD(B)) and can use FB values to determine whether accesses should be split (e.g., LD(F) which needs to access and two different courts/banks). Accesses are commonly split in cases of unaligned accesses which request data spanning across more than one cache line.

It should be noted that in one embodiment, the ports could be implemented where the whole cache is just one unified multi-ported bank, or where the cache can be split where a cache line is divided across multiple banks such that each bank has one or few ports, in such case paired accesses are checked to be to the same bank of the cache line.

Figure 9:
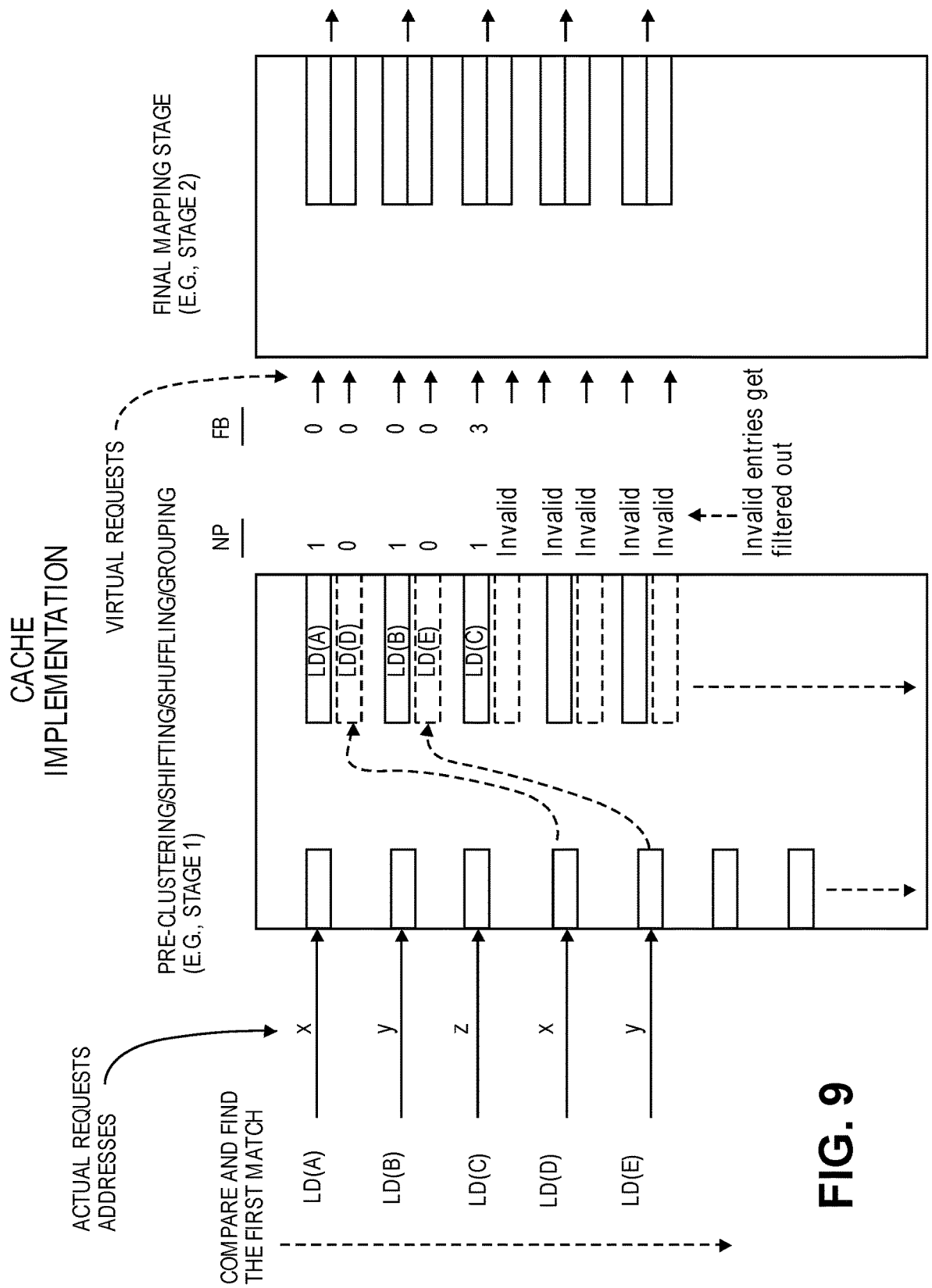
FIG. 9 shows a diagram illustrating the two-stage remapping process in accordance with ports of a cache in accordance with one embodiment of the present invention.

FIG. 9 shows a diagram illustrating the two-stage remapping process in accordance with ports of a cache in accordance with one embodiment of the present invention. For example, although FIG. 8 only depicts a single stage, FIG. 9, for purposes of illustration, depicts the two-stage process in accordance with one embodiment of the present invention. As described earlier in the discussion of FIG. 1, with the two-stage process, the first stage performs a pre-clustering/shifting/shuffling/grouping the initial inputs, which in this case are accesses to a cache. The second stage performs a final mapping of the accesses to the cache.

In the FIG. 9 embodiment, to find load requests that are headed to the same cache line, compare logic is used to scan the group of incoming load requests and find the first match. For example, when LD(A) is examined, compare logic finds LD(D) that is headed to the same cache line. This results in LD(D) being shuffled or virtually associated to be next to LD(A). The same thing happens with LD(B) where the compare logic finds LD(E). This can be implemented as a compare and find the first match, as shown.

As load requests are shuffled and reordered, of their initial positions and resulting positions in the pre-clustering stage can be invalidated if there's not a corresponding load request to be transferred to the second stage. The presentation of the load requests from the pre-clustering stage to the remapping stage are referred to as virtual requests.

The result of the remapping comprises a plurality merged load requests when accessing the same cache line (e.g, NP=0). A different result of the remapping comprises a non-aligned access split (e.g., FB=3) where a non-aligned access is split into two cache line accesses.

Once the reordered virtual requests received by the second stage, they are remapped (e.g., in accordance with the NP variable or the FB variable) into unified merged outgoing load requests, where some virtual requests have been combined and some virtual requests have been split.

It should be noted that the implementation of the final mapping stage is the same as the examples described earlier in the previous figures. As shown, invalid virtual requests are automatically deleted, or otherwise filtered out. It is worth noting that the NP bit is set and examined after the invalid requests have been filtered out.

Figure 10:
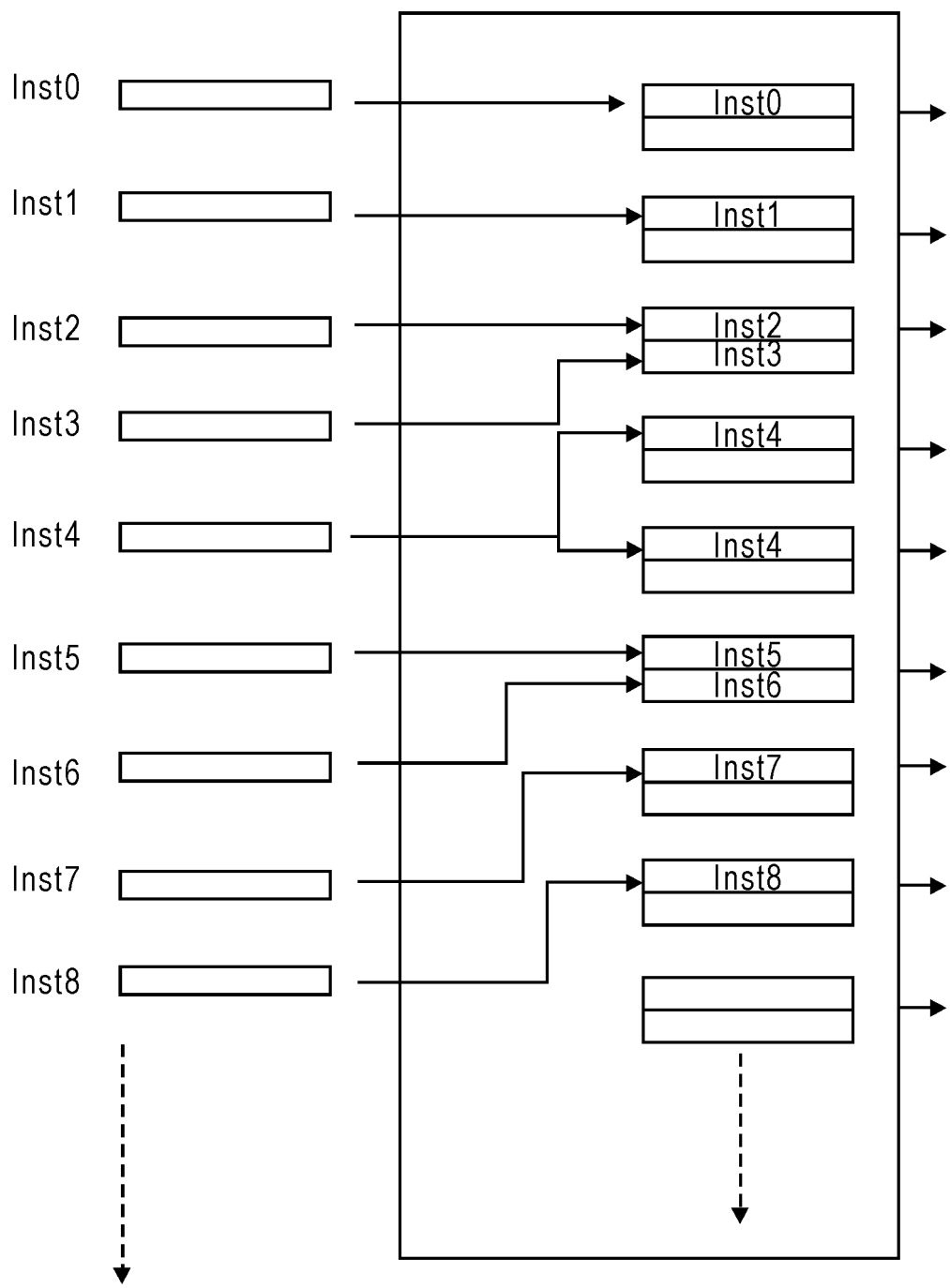
FIG. 10 describes the operation of a computer instruction implementation, where computer instructions are repositioned and fused or split into new outgoing computer instructions in accordance with one embodiment of the present invention.

FIG. 10 describes the operation of a computer instruction implementation, where computer instructions are repositioned and fused or split into new outgoing computer instructions in accordance with one embodiment of the present invention. FIG. 10 shows how the structure script in the figures above can be used in a computer instruction implementation where incoming instructions, instructions 0 through 8, can either be fused or split to create a new outgoing instructions. This is shown in FIG. 10 by the parallel fusing and splitting of instructions into final instructions/micro-operations. The block implements a parallel packing/splitting of instructions such as operation fusing or operation splitting into micro-operations. In a manner similar to the embodiments described above, the NP value can determine which instructions get fused, and the FB value can determine which instructions get split. In a manner similar to the embodiments described above, the resulting instructions have an upper half and a lower half (e.g., or odd/even).

Figure 11:
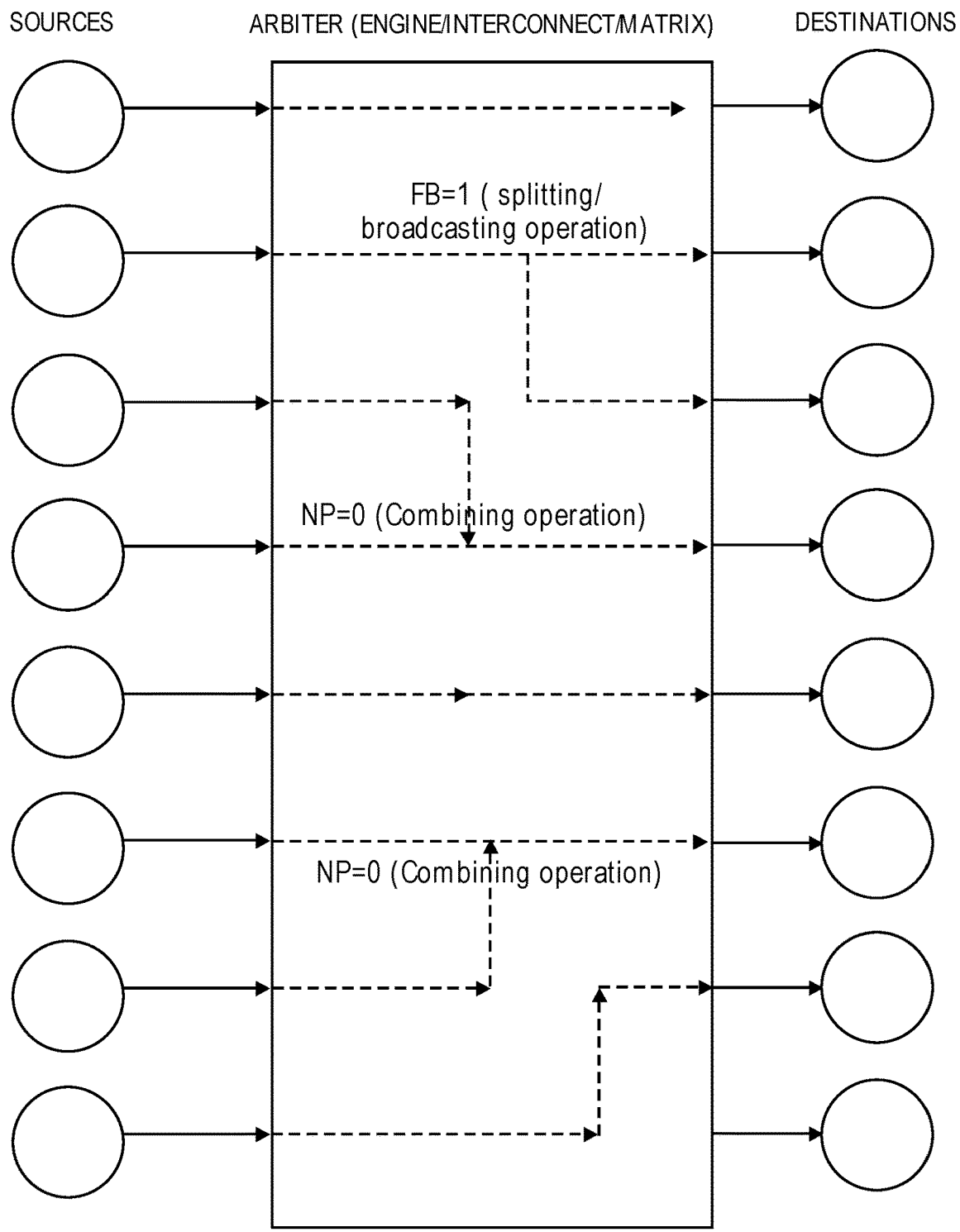
FIG. 11 describes the operation of an arbiter implementation, where different sources are arbitrated for multiple outgoing destinations in accordance with one embodiment of the present invention.

FIG. 11 describes the operation of an arbiter implementation, where different sources are arbitrated for multiple outgoing destinations in accordance with one embodiment of the present invention. FIG. 11 shows an implementation where the structure described in the above embodiments is used to perform an arbitration between different sources going to multiple destinations. For example, some requests from multiple sources can be combined to the same destination. Some other requests can be broadcast to multiple destinations. In a manner similar to the embodiments described above, the NP value can determine which requests get combined, and the FB value can determine which requests get split.

For example, in one embodiment, NP=0 leads to a merging operation (combining). This is often seen in paring/wake up communications (e.g., power-down/sleep, reset). An example would be a printer or other types of peripheral devices). FB=1 leads to a split operation (e.g., splitting into two or more). This is often seen in broadcast communications.

In the FIG. 11 embodiment, NP=0 leads to a merging operation (combining). This is often seen in paring/wake up communications an example would be requests to a printer or other types of peripheral devices. In this embodiment, FB=1 leads to a split operation (splitting into two or more). This is often seen in broadcast communications or power-down/sleep, reset.

Figure 12:
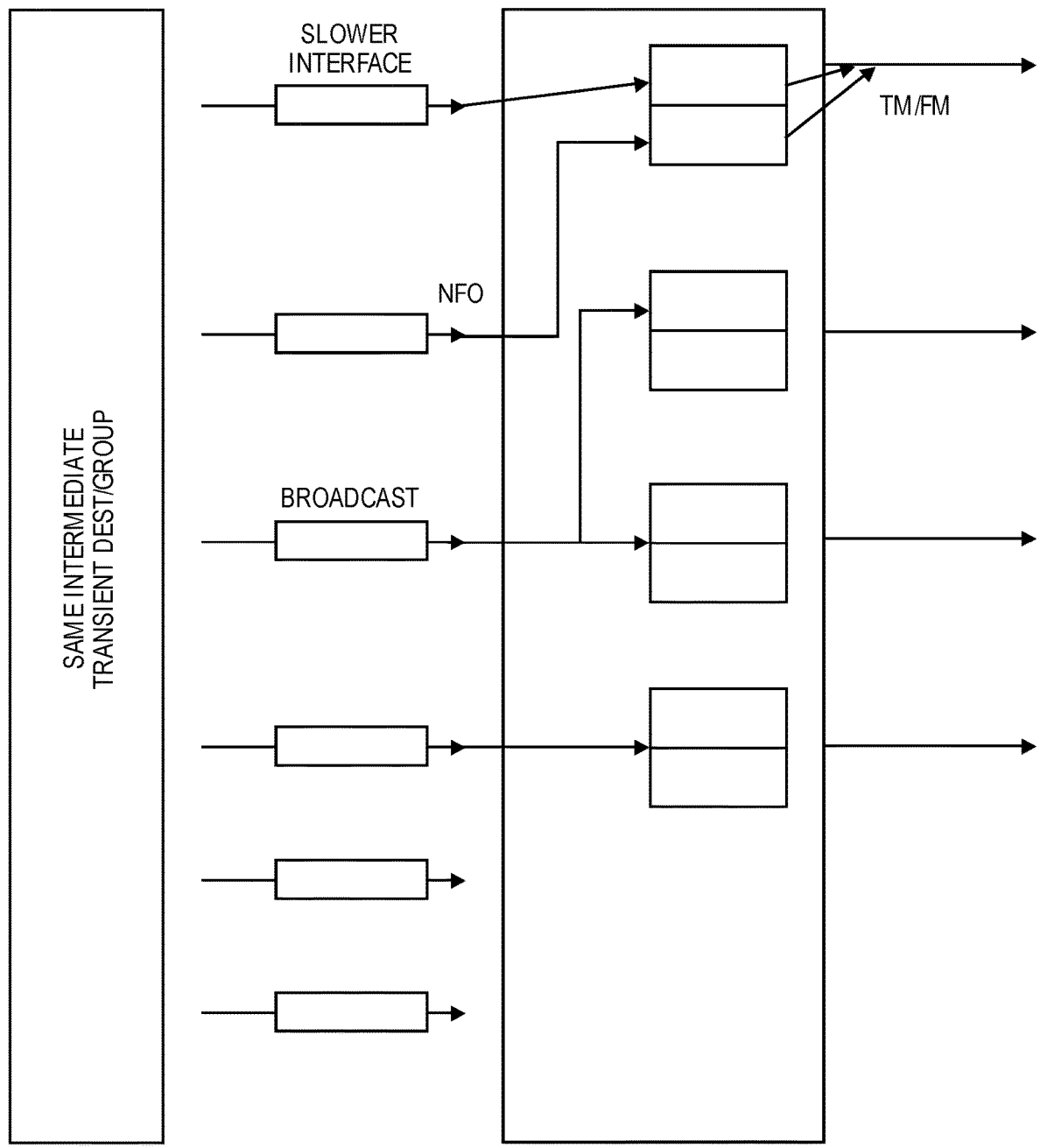
FIG. 12 shows another diagram of an arbiter implementation, where different sources are arbitrated for multiple outgoing destinations in accordance with one embodiment of the present invention.

FIG. 12 shows another diagram of an arbiter implementation, where different sources are arbitrated for multiple outgoing destinations in accordance with one embodiment of the present invention. The FIG. 12 diagram shows an explicit two-stage implementation. The first stage performs presorting and pre-clustering in the manner described above. The second stage performs final sorting combining in splitting in the manner described above. In the FIG. 12 embodiment, the input shown between the first stage and the second stage are broadcast streams that have different bandwidth requirements these broadcast streams can be combined into a single higher-speed output broadcast that, for example implements a faster time multiplexing or frequency multiplexing output, as shown.

Figure 13:
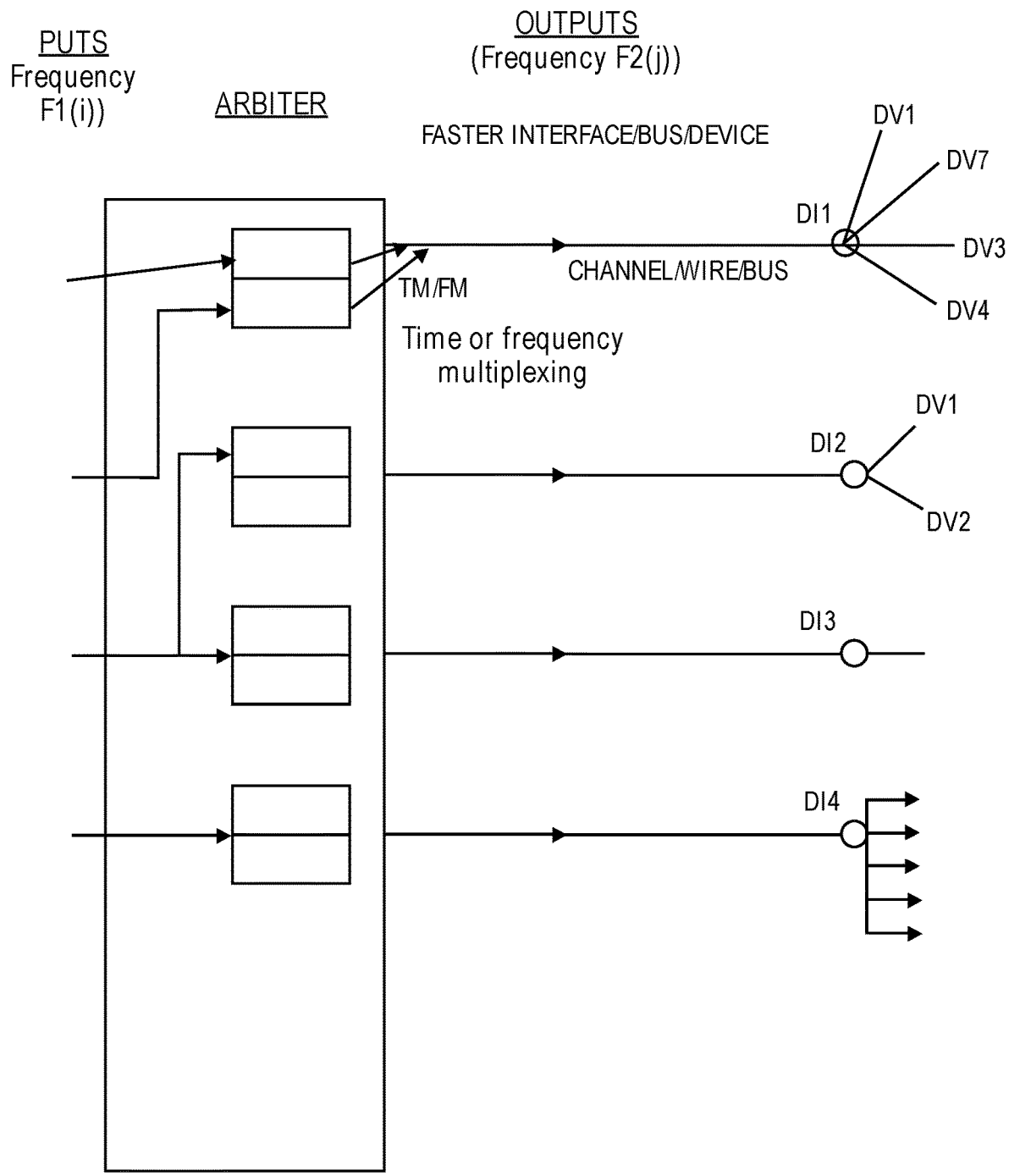
FIG. 13 shows another diagram of an arbiter implementation, where different sources are arbitrated for multiple outgoing destinations in accordance with one embodiment of the present invention.

FIG. 13 shows another diagram of an arbiter implementation, where different sources are arbitrated for multiple outgoing destinations in accordance with one embodiment of the present invention. In the FIG. 13 diagram the outputs are shown as different faster interfaces or buses or channels. The inputs on the left side of FIG. 13 can comprise lower frequency/lower bandwidth inputs. The arbiter functions by combining or splitting these inputs into higher-paying with higher frequency outputs as shown. The outputs can have higher bandwidth by using, for example, time multiplexing or frequency multiplexing. The inputs comprise streams that utilize output bandwidth. The arbiter arbitrates amongst the input streams using frequency and/or time multiplexing to create resulting output streams. Pairing implies that the requests are ordered back to back so that the requests get optimal DRAM access time. The right-hand side of FIG. 13 shows the different destinations. For example, some destinations are broadcast stations going to many different final destinations. Other destinations are single point destinations.

FIG. 14 shows a graphical depiction of a spreadsheet illustrating the modulo two evaluation equations in accordance with one embodiment of the present invention. The upper part of the spreadsheet shows a serial mode evaluation process (e.g., serial mode FB/NP). The lower part of the spreadsheet shows a parallel mode evaluation process (e.g., parallel mode FB/NP). It should be noted that the spreadsheet shows the equations that were illustrated during the evaluation process described in FIG. 6. The formulas first calculate the cumulative displacement from initial position caused by bubbles. Then the new position is calculated by adding to the initial position the cumulative sum of the cumulative displacement. In a serial process, as shown by the upper part of FIG. 14, this cumulative sum happens in a cycle by cycle process. In the parallel process, as described in the description of FIG. 6, the cumulative sum is computed in parallel, as shown by the lower part of FIG. 14.

Figure 15:
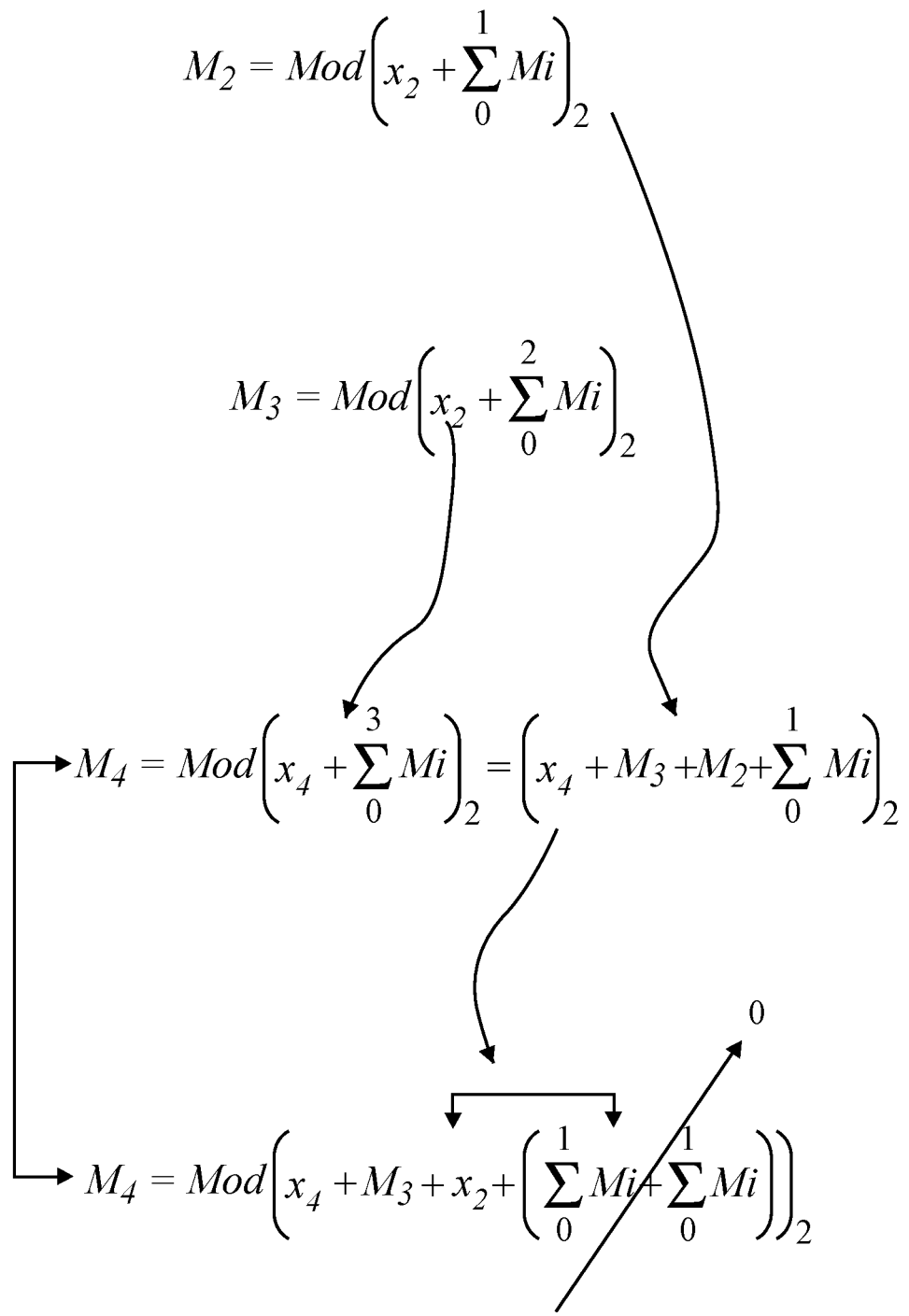
FIG. 15 shows the operation of the cumulative sum evaluation process in accordance with one embodiment of the present invention.

FIG. 15 shows the operation of the cumulative sum evaluation process in accordance with one embodiment of the present invention. FIG. 15 shows an example of how the modulo two term equations can be simplified by unrolling recursive terms and zeroing out duplicate terms. This takes advantage of the properties of modulo two arithmetic. The first three lines of FIG. 14 shows the terms M2, M3, and M4. These terms are shown in greater detail in FIG. 14. The modulo terms copied from FIG. 14 are shown here in FIG. 15. As the modulo terms are unrolled, duplicate terms can be zeroed out. This is shown by line four of FIG. 15, where the duplicate term of M4 is zeroed out. This property results in a reduction in the number of terms that need to be recursively summed, thus simplifying the parallelization of the circuit that implements the formula.

Figure 16:
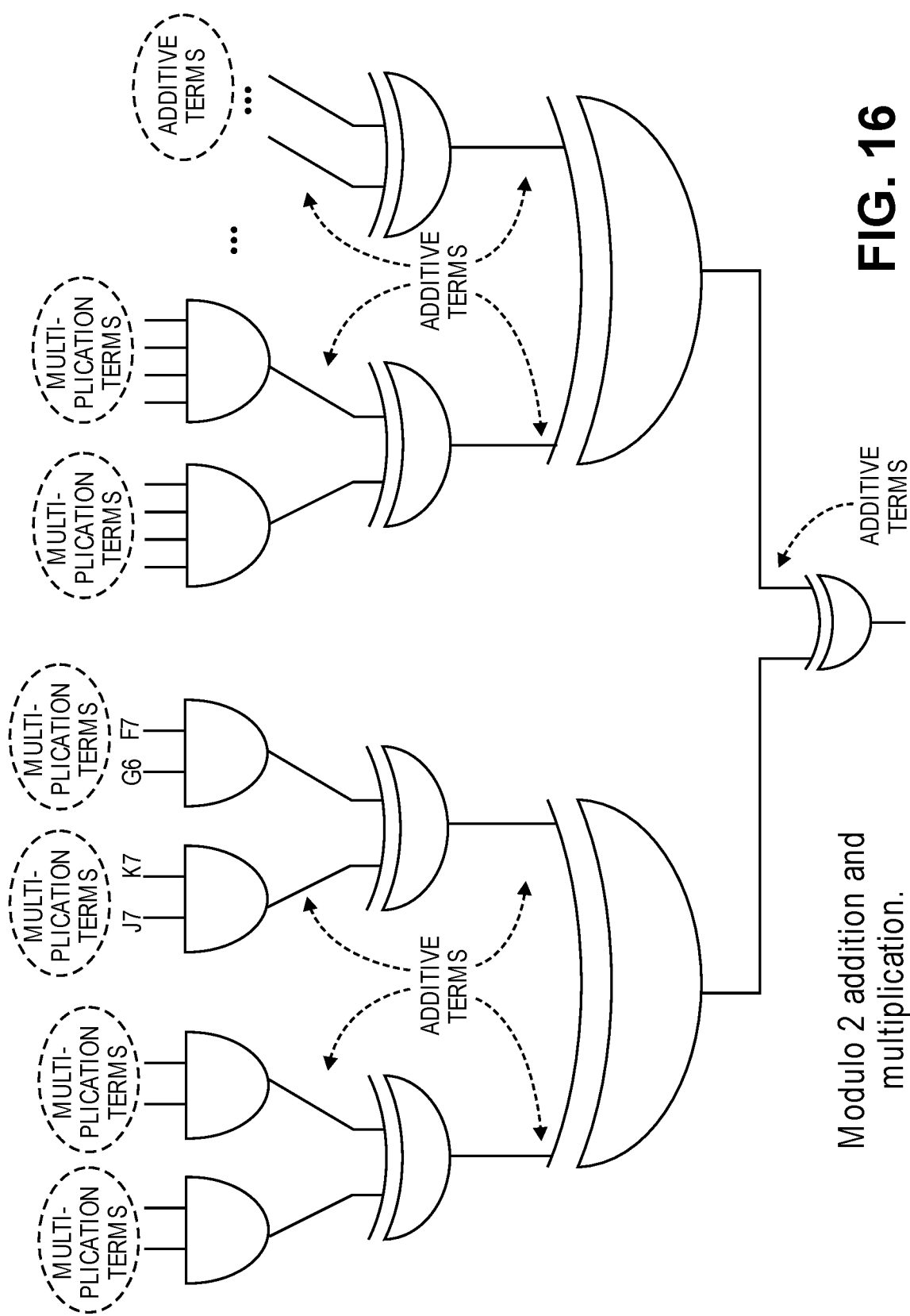
FIG. 16 shows a diagram depicting a circuit for performing the cumulative sum evaluation in parallel in accordance with one embodiment of the present invention.

FIG. 16 shows a diagram depicting a circuit for performing the cumulative sum evaluation in parallel in accordance with one embodiment of the present invention. FIG. 16 shows how multiplication terms of the are implementing using AND gates and the attitude terms are implementing using XOR gates. Thus, FIG. 16 shows a logic circuit that performs both modulo two addition and multiplication.

This diagram shows a stage optimized high-speed remapping logic structure that is used to solve the module to function depicted in a single clock cycle. The remapping logic is particularly suited to any application where a plurality of one bit inputs need to be quickly added to produce a one or two bit output. The objective of the remapping logic structure is to do a mapping or packing or splitting of encountered packets in parallel and at line speed. In order to do this, the structure takes advantage of two observations. The first observation is that when unrolling the recursive sum equation as shown in the figure, the duplicate sum elements will zero out under modulo 2 arithmetic. The second observation is how addition elements and multiplication elements within the recursive sum equation shown in the figure behave under modulo 2 arithmetic. Under such conditions, addition elements become XOR functions and multiplication elements become AND functions. This allows the recursive sum equation to be mapped to logical circuits as shown in the figure. Elements within the parentheses are multiplication and are thus operated on by the AND gates. Elements outside of the parentheses are additions and are thus operated on by the XOR gates. The equation now becomes completely unrolled in space instead of being serialized.

To find the new positions of the remapping, the outputs of these logical functions are used to feed a parallel adder, and this parallel adder produces the final remapping of the virtual requests into the new positions. In this manner, the circuit performs the two actions described above where two or more of those inputs (e.g., virtual requests) can be combined, merged or grouped to form a merged request. The other action can be splitting or fragmenting the virtual request or packet into two or more requests.

In this manner, the circuit takes a serial addition process, where the placement of each virtual request depends upon the placement of each prior virtual request, and implements the Modulo 2 function in parallel, to produce remapped output requests.

Figure 17:
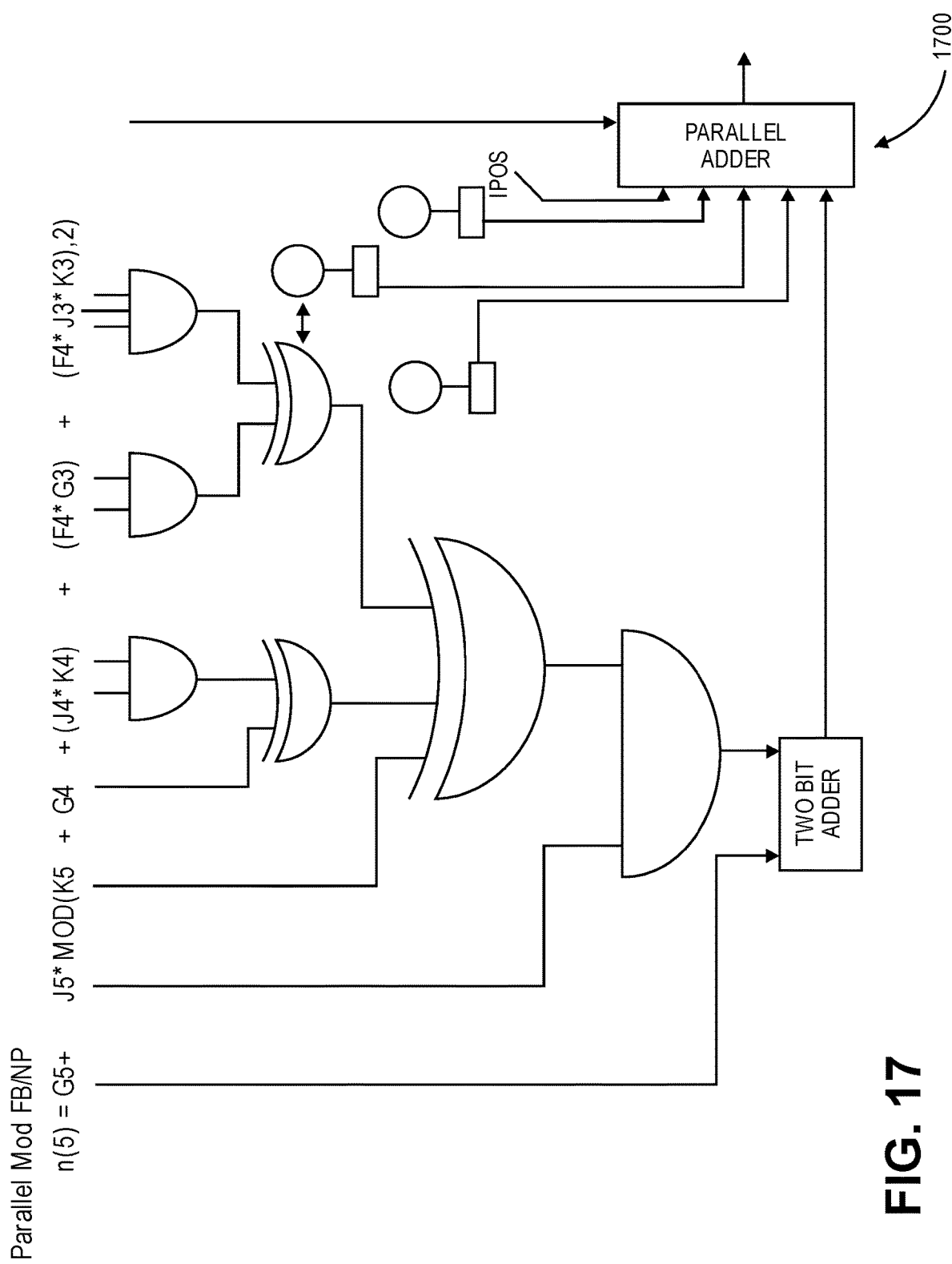
FIG. 17 shows a diagram of a circuit performing an evaluation of the cumulative sum in accordance with one embodiment of the present invention.

FIG. 17 shows a diagram of a circuit performing an evaluation of the cumulative sum in accordance with one embodiment of the present invention. FIG. 7 shows how the terms of an evaluation equation are processed by hardware components of evaluation circuit. This diagram also shows a stage optimized high-speed adder circuit (e.g., a parallel adder 1700) that is used to solve the module to function depicted in a single clock cycle. The circuit is particularly suited to any application where a plurality of one bit inputs need to be quickly added to produce a one or two bit output. Details of the parallel adder 1700 are further described in FIG. 21 below.

As described above, line speed has a big impact in such applications that cannot tolerate latency. One example is from networking applications where it is required to forward incoming packets to different destinations, thus a very high-speed circuit is required. The figures above illustrate several embodiments of such a high-speed circuit and illustrate uses of such a structure in a networking environment switching/routing packets, in a processing environment managing accesses to different cache lines and accesses to different open DRAM pages, and any processing environment merging/fusing and/or splitting/decoding macro instructions into corresponding merged and/or split micro-instructions.

Additionally, as described above, many implementations, input elements come as a paralleled requests or packets and they undergo one or two generic actions. Two or more of those inputs can be combined, merged or grouped to form a unified/uniform request or packet. The other action can be splitting or fragmenting the request or packet into two or more requests or packets. First example is variable length networking packets. The same concepts can be applied to fixed size packets where multiple fixed sizes are supported.

The FIG. 17 circuit that perform such functionality can be constructed as a serial modular sum (e.g., where it is illustrated with Modulo 2 functionality, as examples of merging 2 elements and splitting into 2 or 4 are given), however it should be noted that this functionality can be also applied in a hierarchal way for merging more than 2 in multi steps. In this manner, FIG. 17 shows novel penalization reduction scheme in which many of the circuit components are reduced into parallel AND-XOR gates with parallel adders associated with them to achieve line speed.

Figure 18:
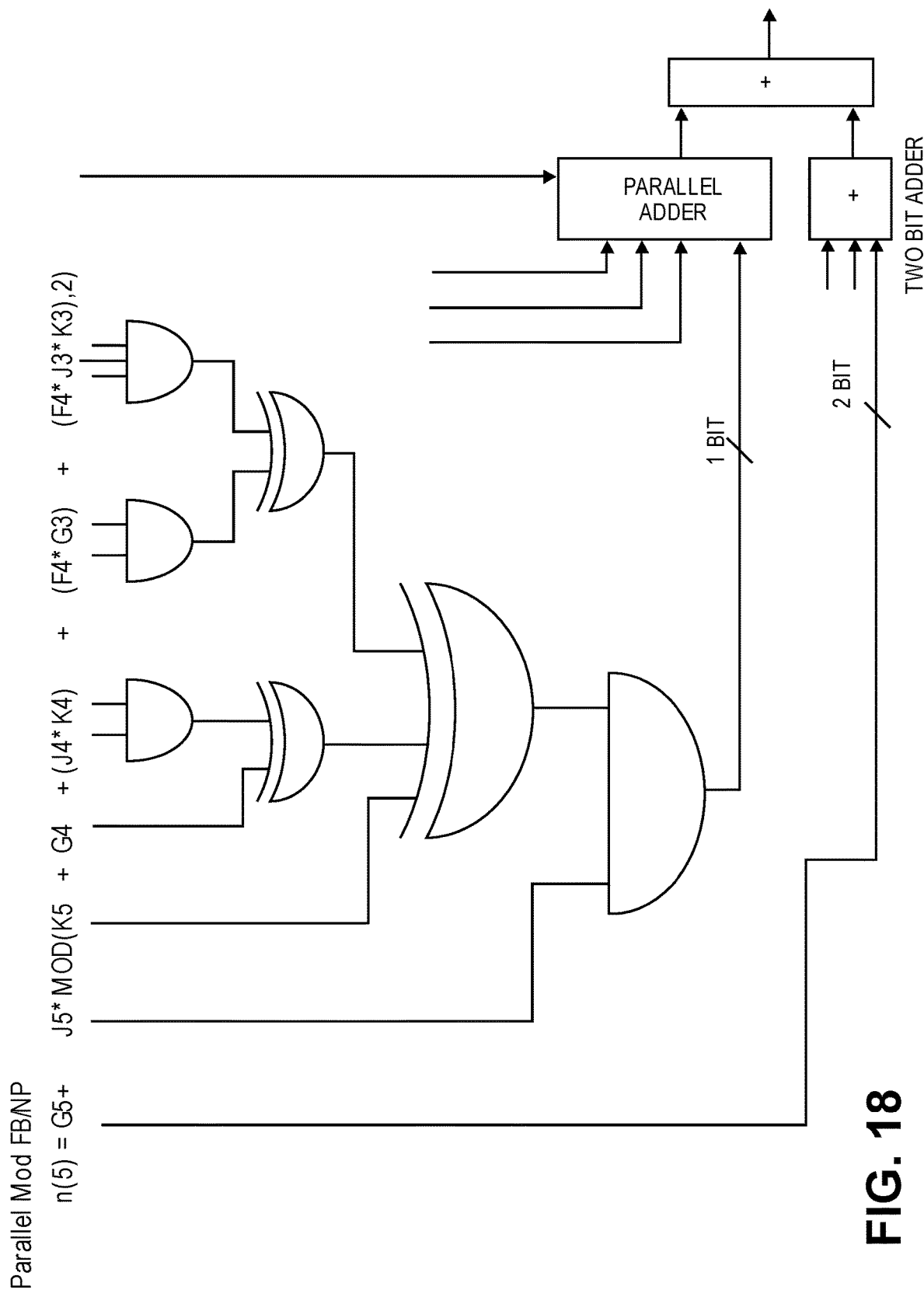
FIG. 18 shows a diagram of a second circuit performing an evaluation of the cumulative sum in accordance with one embodiment of the present invention.

FIG. 18 shows a diagram of a second circuit performing an evaluation of the cumulative sum in accordance with one embodiment of the present invention. FIG. 18 be similar to FIG. 17, however FIG. 18 shows a two bit adder used in conjunction with a parallel one bit adder. The FIG. 18 diagram shows how the equations for taking initial positions and computing final positions therefrom are computed in parallel. As described above, the elements of the equation can be resolved into multiplication terms and addition terms. The multiplication terms are solved by AND gates as shown. The addition terms are solved by XOR Gates as shown. FIG. 18 shows an example of the circuit solving the equation for initial position five (e.g., n(5)). Each of the initial positions (e.g., initial positions 1 through 10 in this example) will have a corresponding equation with a corresponding circuit similar to the one shown in FIG. 18. The results of each of these equations are inputs to a high-speed parallel adder, such as the adder 1700.

Figure 19:
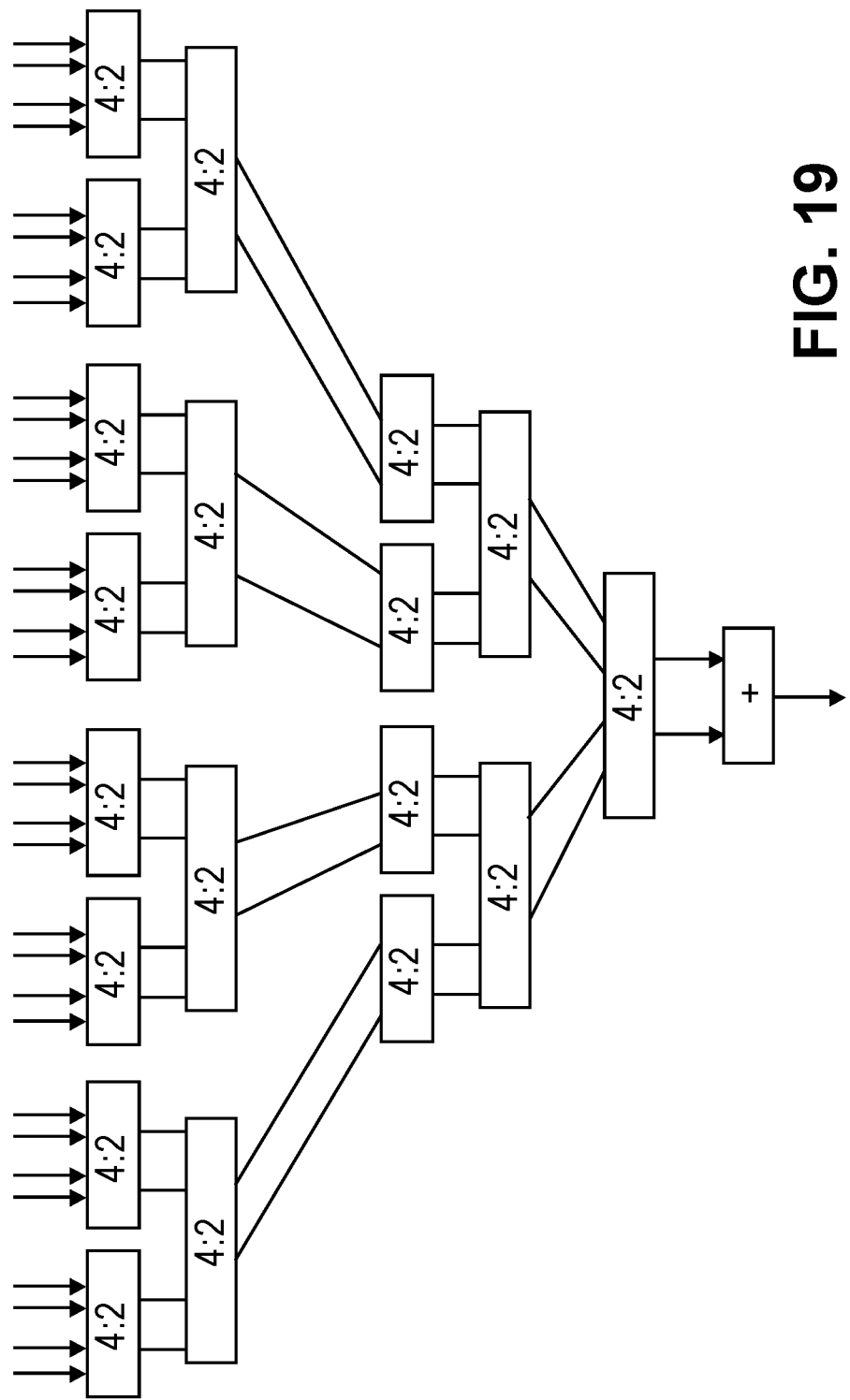
FIG. 19 shows an exemplary architecture for a parallel adder implementation.

FIG. 19 shows an exemplary architecture for a parallel adder implementation. FIG. 19 shows how 4:2 carry save adders can be used to implement a parallel adder.

Figure 20:
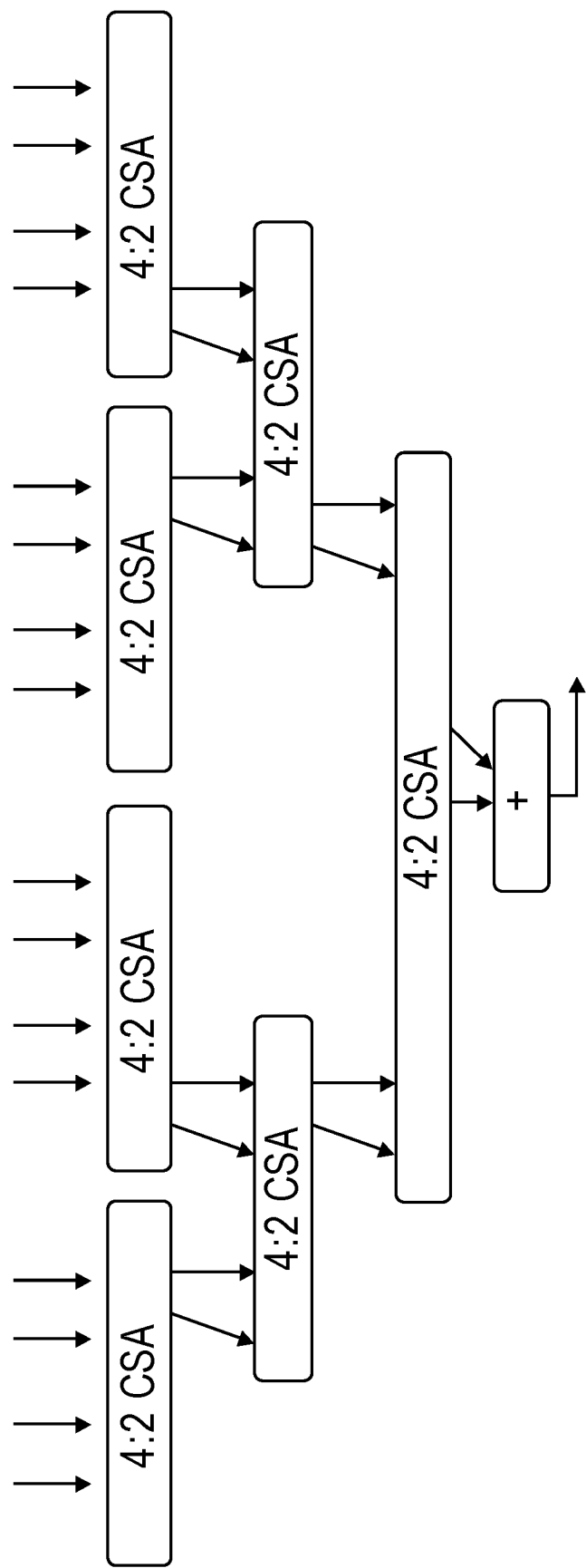
FIG. 20 shows a diagram depicting a parallel carry save adders in accordance with one embodiment of the present invention.

FIG. 20 shows a diagram depicting a parallel carry save adders in accordance with one embodiment of the present invention. As shown in FIG. 20, traditional parallel 4:2 carry save adders are used to perform summation of parallel inputs, such as ready bits in a processor scheduling used to choose instructions for dispatch, or to map instructions selected for dispatch to a corresponding dispatch port, or for example, being used to sum valid bits for counting valid sparse entries and assigning allocation write ports to them.

FIG. 21 shows an embodiment of a stage optimized high-speed parallel adder in accordance with one embodiment of the present invention. The FIG. 21 embodiment can be used to implement the parallel adder 1700 shown in FIG. 17. The upper portion of FIG. 21 shows the arrival time of inputs and also shows three 4:1 adders and one 2:1 adder. The lower portion of FIG. 21 shows how the 4:1 adder is implemented. The middle portion of the FIG. 21 shows the use of two 3:2 carry save adders coupled to receive the outputs of the three 4:1 adders and one 2:1 adder above them. This arrangement saves one 4:2 carry save adder stage in comparison to traditional parallel adders, thus making the FIG. 21 embodiment much faster. The implementation takes advantage of the fact that the parallel inputs are each one bit inputs, allowing the circuit to be optimized accordingly.

In FIG. 21, the adder can be used to perform summation of one bit inputs, such as ready bits in a processor scheduling used to choose instructions for dispatch, or to map instructions selected for dispatch to a corresponding dispatch port, or for example, being used to sum valid bits for counting valid sparse entries and assigning allocation write ports to them.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for line speed cache access request processing, comprising:
    receiving a plurality of cache access requests;
    performing a pre-sorting of the plurality of cache access requests by a first stage to order the plurality of cache access requests, wherein the first stage functions by performing a presorting and pre-clustering process on the plurality of cache access requests in parallel to map the plurality of cache access requests from a first position to a second position corresponding to ports or banks of a cache memory;
    performing a combining of at least two cache access requests into a single cache access request where the at least two cache access requests are in adjacent positions after the pre-sorting in the first stage and splitting of a cache access request into at least two cache access requests, the at least two cache access requests and the single cache access request from the plurality of cache access requests, by a second stage; and
    applying the plurality of cache access requests to the cache memory at line speed.

2. The method of claim 1, wherein the first stage performs position shuffling, pairing, and splitting of the cache access requests based on cache address of each of the plurality of cache access requests.

3. The method of claim 1, wherein the combining combines cache access requests that access a same position or address in the cache memory.

4. The method of claim 1, wherein the splitting splits cache access requests that access requests to different positions or addresses in the cache memory.

5. The method of claim 1, wherein the cache access requests presented to the second stage are virtual requests.

6. The method of claim 1, wherein cache access requests to non-aligned addresses are split.

7. A processor device, comprising:
    a cache memory; and
    a cache controller coupled to the cache memory, wherein the cache controller receives a plurality of cache access requests, performs a pre-sorting of the plurality of cache access requests by a first stage to order the plurality of cache access requests, wherein the first stage functions by performing a presorting and pre-clustering process on the plurality of cache access requests in parallel to map the plurality of cache access requests from a first position to a second position corresponding to ports or banks of a cache memory, performs a combining of at least two cache access requests into a single cache access request where the at least two cache access requests are in adjacent positions after the pre-sorting in the first stage and splitting of a cache access request into at least two cache access requests, the at least two cache access requests and the single cache access request from the plurality of cache access request by a second stage, and applies the plurality of cache access requests to the cache memory at line speed.

8. The processor of claim 7, wherein the first stage performs position shuffling, pairing, and splitting of the cache access requests based on cache address of each of the plurality of cache access requests.

9. The processor of claim 7, wherein the combining combines cache access requests that access a same position or address in the cache memory.

10. The processor of claim 7, wherein the splitting splits cache access requests that access requests to different positions or addresses in the cache memory.

11. The processor of claim 7, wherein the cache access requests presented to the second stage are virtual requests.

12. The processor of claim 7, wherein cache access requests to non-aligned addresses are split.

13. A computer system, comprising:
   a main memory;
   a processor;
   a cache memory coupled to the processor and the main memory; and
   a cache controller coupled to the cache memory, wherein the cache controller receives a plurality of cache access requests, performs a pre-sorting of the plurality of cache access requests by a first stage of the cache controller to order the plurality of cache access requests, wherein the first stage functions by performing a presorting and pre-clustering process on the plurality of cache access requests in parallel to map the plurality of cache access requests from a first position to a second position corresponding to ports or banks of a cache memory, performs a combining of at least two cache access requests into a single cache access request where the at least two cache access requests are in adjacent positions after the pre-sorting in the first stage and splitting of a cache access request into at least two cache access requests, the at least two cache access requests and the single cache access request from the plurality of cache access requests, by a second stage of the cache controller, and applies the plurality of cache access requests to the cache memory at line speed.

14. The computer system of claim 13, wherein the first stage of the cache controller performs position shuffling, pairing, and splitting of the cache access requests based on cache address of each of the plurality of cache access requests.

15. The computer system of claim 13, wherein the combining combines cache access requests that access a same position or address in the cache memory.

16. The computer system of claim 15, wherein the splitting splits cache access requests that access requests to different positions or addresses in the cache memory.

17. The computer system of claim 15, wherein the cache access requests presented to the second stage are virtual requests.

18. The computer system of claim 15, wherein cache access requests to non-aligned addresses are split.

* * * * *